US012638069B2

(12) United States Patent
Takahashi et al.

(10) Patent No.: US 12,638,069 B2
(45) Date of Patent: May 26, 2026

(54) TRANSMISSION STRUCTURE

(71) Applicants: KANZAKI KOKYUKOKI MFG. CO., LTD., Amagasaki (JP); YANMAR HOLDINGS CO., LTD., Osaka (JP)

(72) Inventors: Takumi Takahashi, Amagasaki (JP); Kohei Ogura, Amagasaki (JP); Tasuku Inoue, Amagasaki (JP)

(73) Assignees: KANZAKI KOKYUKOKI MFG. CO., LTD., Amagasaki (JP); YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 19/082,834

(22) Filed: Mar. 18, 2025

(65) Prior Publication Data
US 2025/0305569 A1 Oct. 2, 2025

(30) Foreign Application Priority Data
Mar. 27, 2024 (JP) ................................. 2024-050826

(51) Int. Cl.
*F16H 47/04* (2006.01)
*F16H 3/44* (2006.01)
(Continued)

(52) U.S. Cl.
CPC .............. *F16H 47/04* (2013.01); *F16H 3/44* (2013.01); *F16H 61/702* (2013.01);
(Continued)

(58) Field of Classification Search
CPC ........ F16H 47/04; F16H 61/702; F16H 61/70; F16H 61/04; F16H 59/44;
(Continued)

(56) References Cited

U.S. PATENT DOCUMENTS 4,750,381 A * 6/1988 Kita ......................... F16H 47/04
74/720
2012/0046138 A1* 2/2012 Hana ....................... F16H 47/04
475/72

(Continued)

FOREIGN PATENT DOCUMENTS

| JP | 4889600 B2 | 12/2011 |
|---|---|---|
| JP | 5822761 B2 | 10/2015 |
| JP | 2020152364 A * | 9/2020 |

*Primary Examiner* — Timothy Hannon
(74) *Attorney, Agent, or Firm* — CANTOR COLBURN LLP

(57) ABSTRACT

[Problem] To provide a transmission structure that includes a main transmission unit performing continuous speed changing and an auxiliary transmission unit performing multi-stage gear shifting and that can prevent a shock at the time of switching a gear stage of the auxiliary transmission unit during travel as much as possible. [Solution] In the present invention, the controller is configured as follows. When a gear stage switching manipulation is performed by an auxiliary speed change manipulation member during the travel, the controller disengages a pre-switching engagement clutch mechanism in the auxiliary transmission unit to realize an idle running state, operates a speed change output device during the idle running state by setting, as a target, a vehicle speed that corresponds to an actual vehicle speed in a case where an engagement state of a post-switching engagement clutch mechanism is set as a reference, thereafter engages the post-switching engagement clutch mechanism, and controls the operation of the speed change output device by setting, as a target vehicle speed, a vehicle speed that is defined by a manipulation position of a main speed change manipulation member.

9 Claims, 10 Drawing Sheets

(51) Int. Cl.
 F16H 61/70 (2006.01)
 *F16H 37/08* (2006.01)
 *F16H 59/44* (2006.01)

(52) U.S. Cl.
 CPC ...... *F16H 2037/0886* (2013.01); *F16H 59/44*
 (2013.01); *F16H 2200/0034* (2013.01); *F16H*
 *2200/2005* (2013.01)

(58) Field of Classification Search
 CPC .............. F16H 2037/0886; F16H 3/44; F16H
 2200/0034; F16H 2200/2005
 See application file for complete search history.

(56) References Cited

U.S. PATENT DOCUMENTS

2020/0132169 A1\* 4/2020 Iwaki ........................ F16H 3/44
2023/0220910 A1\* 7/2023 Owada .................. F16H 61/431

\* cited by examiner

HST SPEED

FIRST SPEED (+max)

NEUTRAL SPEED (N)

SECOND SPEED
−max

0 a1 (LOW-SPEED STAGE SWITCHING SPEED)

b1 (HIGH-SPEED STAGE SWITCHING SPEED)

a2 (LOW-SPEED STAGE MAXIMUM SPEED)

b2 (HIGH-SPEED STAGE SWITCHING SPEED)

OUTPUT ROTATIONAL SPEED OF TRANSMISSION STRUCTURE (VEHICLE SPEED)

Figures 3A, 3B:
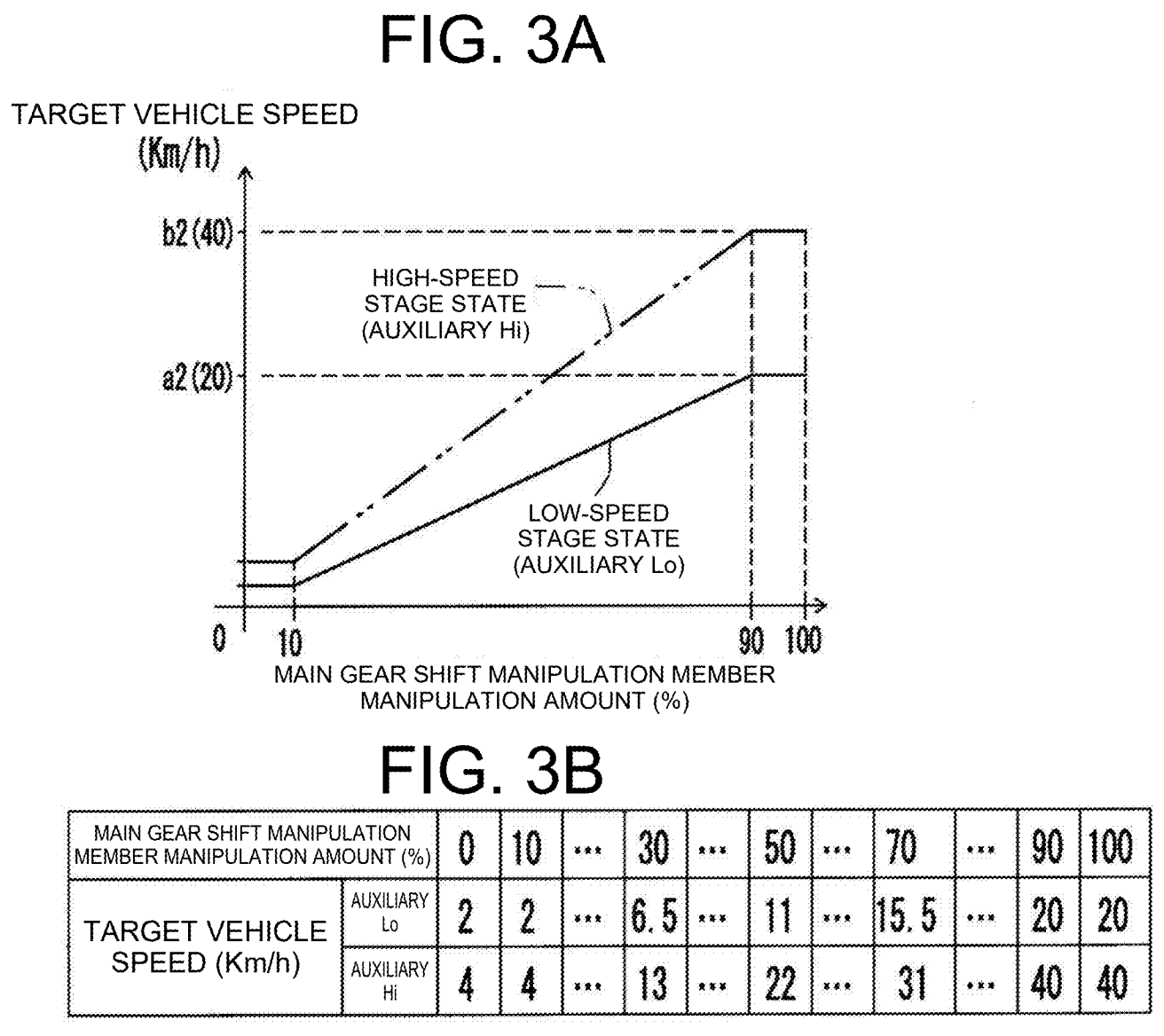

| MAIN GEAR SHIFT MANIPULATION MEMBER MANIPULATION AMOUNT (%) | | 0 | 10 | ... | 30 | ... | 50 | ... | 70 | ... | 90 | 100 |
|---|---|---|---|---|---|---|---|---|---|---|---|---|
| TARGET VEHICLE SPEED (Km/h) | AUXILIARY Lo | 2 | 2 | ... | 6.5 | ... | 11 | ... | 15.5 | ... | 20 | 20 |
| | AUXILIARY Hi | 4 | 4 | ... | 13 | ... | 22 | ... | 31 | ... | 40 | 40 |

TRANSMISSION STRUCTURE

CROSS REFERENCE TO RELATED APPLICATIONS

The present invention claims priority under 35 U.S.C. § 119 to Japanese Application No. 2024-050826, filed on Mar. 27, 2024, the entire contents of which being incorporated herein by reference.

TECHNICAL FIELD

The present invention relates to a transmission structure that includes: a main transmission unit including a planetary gear mechanism that combines and outputs rotary power from a drive source and rotary power from a speed change output device; and an auxiliary transmission unit that is connected in series to the main transmission unit and performs multi-stage gear shifting.

BACKGROUND ART

A transmission structure is suitably used in a travel system transmission path of a work vehicle, such as a combine or a tractor, and various configurations for expanding a vehicle speed variable range have been proposed. The transmission structure includes a main transmission unit that has a planetary gear mechanism, and the planetary gear mechanism combines and outputs rotary power from a drive source and rotary power from a hydro-static transmission (HST) that acts as a speed change output device.

For example, the following transmission structure is disclosed in Patent Document 1 below. In the transmission structure, a hydraulic mechanical transmission (HMT) and multi-stage transmission are arranged in series in a travel system transmission path. The HMT is formed by the HST and the planetary gear mechanism and acts as a main transmission unit. The multi-stage transmission has three speed change stages including a low-speed stage, an intermediate-speed stage, and a high-speed stage and acts as an auxiliary transmission unit.

The transmission structure described in Patent Document 1 is useful in that the vehicle speed variable range can be expanded. However, auxiliary speed change operation by the multi-stage transmission has to be performed when the vehicle is stopped, which causes inconvenience such as a troublesome manipulation and degraded travel work efficiency.

In addition, the following transmission structure is proposed in Patent Document 2. In the transmission structure, the HST that acts as the main transmission unit and a multi-stage auxiliary transmission mechanism that acts as the auxiliary transmission unit are arranged in series. The transmission structure enables gear stage switching operation of the auxiliary transmission mechanism during travel of the vehicle.

The transmission structure described in Patent Document 2 includes a forward/reverse switching mechanism in addition to the HST and the auxiliary transmission mechanism. When the auxiliary transmission manipulation means is operated, the travel speed is detected by the travel speed detection means, and the forward/reverse switching mechanism is temporarily switched from a forward state or a reverse state to a neutral state. Then, the speed of the HST is adjusted so that the travel speed at the new gear stage of the auxiliary transmission mechanism matches the detected travel speed. After that, the gear stage switching operation of the auxiliary transmission mechanism is performed, and finally, the forward/reverse switching mechanism is switched back from the neutral state to the original forward or reverse state.

The transmission structure described in Patent Document 2 can suppress a speed change shock to some extent when the speed change operation of the multi-stage auxiliary transmission mechanism is performed during the travel of the vehicle. However, a travel speed change (a deceleration change in many cases) at the time when the forward/reverse switching mechanism is shifted to the neutral state and the vehicle is in an idle running state is not taken into consideration. As a result, a speed change upon completion of the gear stage switching operation of the auxiliary transmission mechanism is not sufficiently prevented or reduced.

PRIOR ART DOCUMENT

Patent Document

Patent Document 1: Japanese Patent No. 5822761
Patent Document 2: Japanese Patent No. 4889600

SUMMARY OF INVENTION

Technical Problem

The present invention has been made in view of the related art, and therefore has an object of providing a transmission structure that includes a main transmission unit that performs continuous speed changing and an auxiliary transmission unit that performs multi-stage gear shifting, the transmission structure enabling gear stage switching operation of the auxiliary transmission unit during travel of a vehicle and capable of preventing or reducing a shift shock during the gear stage switching operation of the auxiliary transmission unit as much as possible.

Solution to Problem

The present invention is a transmission structure that continuously changes reference rotary power of a drive shaft operatively coupled to a drive source and transmits the changed reference rotary power to a travel output shaft defining a vehicle speed in order to achieve the above object. The transmission structure comprising: a main transmission unit that has a speed change output device outputting transmission rotary power continuously changed at least between a first-speed stage and a second-speed stage and a planetary gear mechanism combining the reference rotary power and the transmission rotary power, and that outputs combined output of the planetary gear mechanism as travel rotary power; an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths; a main speed change manipulation member and an auxiliary speed change manipulation member for manipulating the main transmission unit and the auxiliary transmission unit, respectively; and a controller.

The controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member, and controls operation of the main transmission unit to obtain a target vehicle speed that is defined by a manipulation position of the main speed change manipulation member for each of the low-speed stage state and the high-speed stage state.

Here, the controller is further configured as follows. When a switching manipulation of a gear stage is performed by the auxiliary speed change manipulation member in a state where the travel output shaft is rotationally driven, the controller realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and controls operation of the speed change output device to obtain a vehicle speed that corresponds to an actual vehicle speed at the time in a post-switching gear state realized by a post-switching engagement clutch mechanism, which should be engaged after the switching manipulation by the auxiliary speed change manipulation member, of the low-speed stage and high-speed stage clutch mechanisms, during the idle running state.

Thereafter, the controller shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

The present invention is also a transmission structure that continuously changes reference rotary power of a drive shaft operatively coupled to a drive source and transmits the changed reference rotary power to a travel output shaft defining a vehicle speed in order to achieve the above object. The transmission structure comprising: a main transmission unit that has a speed change output device outputting transmission rotary power continuously changed at least between a first-speed stage and a second-speed stage and a planetary gear mechanism combining the reference rotary power and the transmission rotary power, and that outputs combined output of the planetary gear mechanism as travel rotary power; an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths; a main speed change manipulation member and an auxiliary speed change manipulation member for manipulating the main transmission unit and the auxiliary transmission unit, respectively; and a controller.

The main transmission unit is configured to be able to select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased as the transmission rotary power is shifted from the second-speed stage side to the first-speed stage side.

The controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member.

Here, the controller is further configured as follows. The controller realizes the first-speed stage transmission state when the vehicle speed in the low-speed stage state does not exceed a low-speed stage switching speed or the vehicle speed in the high-speed stage state does not exceed a high-speed stage switching speed. The controller realizes the second-speed stage transmission state when the vehicle speed in the low-speed stage state exceeds the low-speed stage switching speed or the vehicle speed in the high-speed stage state exceeds the high-speed stage switching speed. The controller controls operation of the main transmission unit by setting the vehicle speed that is defined by a manipulation position of the main speed change manipulation member as a target vehicle speed for each of the low-speed stage state and the high-speed stage state. Furthermore, in the case where a switching manipulation of a gear stage is performed by the auxiliary speed change manipulation member when the travel output shaft is rotationally driven and the vehicle speed is equal to or lower than the low-speed stage switching speed, the controller realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and controls operation of the speed change output device to obtain a vehicle speed that corresponds to an actual vehicle speed at the time in a post-switching gear state realized by a post-switching engagement clutch mechanism, which should be engaged after the switching manipulation by the auxiliary speed change manipulation member, of the low-speed stage and high-speed stage clutch mechanisms, during the idle running state.

Thereafter, the controller shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

The present invention is also a transmission structure that continuously changes reference rotary power of a drive shaft operatively coupled to a drive source and transmits the changed reference rotary power to a travel output shaft defining a vehicle speed in order to achieve the above object. The transmission structure comprising: a main transmission unit that has a speed change output device outputting transmission rotary power continuously changed at least between a first-speed stage and a second-speed stage and a planetary gear mechanism combining the reference rotary power and the transmission rotary power, and that outputs combined output of the planetary gear mechanism as travel rotary power; an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths; a main speed change manipulation member and an auxiliary speed change manipulation member for manipulating the main transmission unit and the auxiliary transmission unit, respectively; and a controller.

The main transmission unit is configured to be able to select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased from the lowest speed as the transmission rotary power is shifted from the second-speed stage side to the first-speed stage side.

The controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member.

Here, the controller is further configured as follows. The controller realizes the first-speed stage transmission state when the vehicle speed in the low-speed stage state does not exceed a low-speed stage switching speed or the vehicle speed in the high-speed stage state does not exceed a high-speed stage switching speed. The controller realizes the second-speed stage transmission state when the vehicle speed in the low-speed stage state exceeds the low-speed stage switching speed or the vehicle speed in the high-speed stage state exceeds the high-speed stage switching speed. The controller controls operation of the main transmission unit by setting the vehicle speed that is defined by a manipulation position of the main speed change manipulation member as a target vehicle speed for each of the low-speed stage state and the high-speed stage state. Furthermore, in the case where a switching manipulation of a gear stage is performed by the auxiliary speed change manipulation member when the travel output shaft is rotationally driven, the vehicle speed is equal to or higher than the low-speed stage switching speed and is equal to or lower than the high-speed stage switching speed, the controller realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and switches between the first-speed stage transmission state and the second-speed stage transmission state after controlling operation of the speed change output device to obtain the switching speed in the pre-switching gear state, which has been realized by the pre-switching engagement clutch mechanism, during the idle running state.

Moreover, the controls the operation of the speed change output device to obtain a vehicle speed corresponding to an actual vehicle speed at the time in the post-switching gear state realized by the post-switching engagement clutch mechanism, which should be engaged after the switching manipulation by the auxiliary speed change manipulation member, of the low-speed stage and high-speed stage clutch mechanisms.

Thereafter, the controller shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

The present invention is also a transmission structure that continuously changes reference rotary power of a drive shaft operatively coupled to a drive source and transmits the changed reference rotary power to a travel output shaft defining a vehicle speed in order to achieve the above object. The transmission structure comprising: a main transmission unit that has a speed change output device outputting transmission rotary power continuously changed at least between a first-speed stage and a second-speed stage and a planetary gear mechanism combining the reference rotary power and the transmission rotary power, and that outputs combined output of the planetary gear mechanism as travel rotary power; an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths; a main speed change manipulation member and an auxiliary speed change manipulation member for manipulating the main transmission unit and the auxiliary transmission unit, respectively; and a controller.

The main transmission unit can select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased from the lowest speed as the transmission rotary power is shifted from the second-speed stage side to the first-speed stage side.

The controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member.

Here, the controller is further configured as follows. The controller realizes the first-speed stage transmission state when the vehicle speed in the low-speed stage state does not exceed a low-speed stage switching speed or the vehicle speed in the high-speed stage state does not exceed a high-speed stage switching speed. The controller realizes the second-speed stage transmission state when the vehicle speed in the low-speed stage state exceeds the low-speed stage switching speed or the vehicle speed in the high-speed stage state exceeds the high-speed stage switching speed. Then, the controller controls operation of the main transmission unit by setting the vehicle speed that is defined by a manipulation position of the main speed change manipulation member as a target vehicle speed for each of the low-speed stage state and the high-speed stage state.

Furthermore, in the case where a switching manipulation of a gear stage is performed by the auxiliary speed change manipulation member when the travel output shaft is rotationally driven and the vehicle speed is equal to or higher than the high-speed stage switching speed and equal to or lower than a low-speed stage highest speed, the controller realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and controls operation of the speed change output device to obtain a vehicle speed that corresponds to an actual vehicle speed at the time in a post-switching gear state realized by a post-switching engagement clutch mechanism, which should be engaged after the switching manipulation by the auxiliary speed change manipulation member, of the low-speed stage and high-speed stage clutch mechanisms, during the idle running state.

Thereafter, the controller shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

The present invention is also a transmission structure that continuously changes reference rotary power of a drive shaft operatively coupled to a drive source and transmits the changed reference rotary power to a travel output shaft defining a vehicle speed in order to achieve the above object. The transmission structure comprising: a main transmission unit that has a speed change output device outputting transmission rotary power continuously changed at least between a first-speed stage and a second-speed stage and a planetary gear mechanism combining the reference rotary power and the transmission rotary power, and that outputs combined output of the planetary gear mechanism as travel rotary power; an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths; a main speed change manipulation member and an auxiliary speed change manipulation member for manipulating the main transmission unit and the auxiliary transmission unit, respectively; and a controller.

The main transmission unit can select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased from the lowest speed as the transmission rotary power is shifted from the second-speed stage side to the first-speed stage side.

The controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member.

Here, the controller is further configured as follows. The controller realizes the first-speed stage transmission state when the vehicle speed in the low-speed stage state does not exceed a low-speed stage switching speed or the vehicle speed in the high-speed stage state does not exceed a high-speed stage switching speed. The controller realizes the second-speed stage transmission state when the vehicle speed in the low-speed stage state exceeds the low-speed stage switching speed or the vehicle speed in the high-speed stage state exceeds the high-speed stage switching speed. Then, the controller controls operation of the main transmission unit by setting the vehicle speed that is defined by a manipulation position of the main speed change manipulation member as a target vehicle speed for each of the low-speed stage state and the high-speed stage state.

Furthermore, in the case where a switching manipulation from a high-speed stage to a low-speed stage is performed by the auxiliary speed change manipulation member when the travel output shaft is rotationally driven and the vehicle speed is equal to or higher than the low-speed stage highest speed, the controller controls operation of the speed change output device to reduce the vehicle speed to the low-speed stage highest speed while maintaining an engaged state of the high-speed stage clutch mechanism, realizes an idle running state by shifting the high-speed stage clutch mechanism to a disengaged state after the deceleration, and controls the operation of the speed change output device to obtain a vehicle speed that corresponds to an actual vehicle speed at the time in the low-speed stage state realized by the low-speed stage clutch mechanism during the idle running state.

Thereafter, the controller shifts the low-speed stage clutch mechanism to an engaged state, and, in the low-speed stage state, controls the operation of the speed change output device by setting the vehicle speed that is defined by the manipulation position of the main speed change manipulation member at the time as the target vehicle speed.

In the various configurations, preferably, when the switching manipulation of the gear stage is performed by the auxiliary speed change manipulation member, the controller controls the operation of the speed change output device to realize a constant speed travel state, where the vehicle speed at the time is maintained, only for a predetermined time, and thereafter realizes the idle running state.

In an aspect, the main transmission unit has: a speed change transmission path, through which the transmission rotary power is transmitted to a third element of three planetary elements of the planetary gear mechanism; first and second input-side transmission paths, through which the reference rotary power is respectively transmitted to a first element and a second element of the three planetary elements of the planetary gear mechanism; first and second input-side clutch mechanisms that respectively engage/disengage the first and second input-side transmission paths; first and second output-side transmission paths, through which rotary power of the first element and the second element are respectively transmitted to a travel intermediate shaft; and first and second output-side clutch mechanisms that respectively engage/disengage the first and second output-side transmission paths, realizes the first-speed stage transmission state by engagement of the first input-side and output-side clutch mechanisms, and realizes the second-speed stage transmission state by engagement of the second input-side and output-side clutch mechanisms, and the auxiliary transmission unit is arranged to perform multi-stage gear shifting between the travel intermediate shaft and the travel output shaft.

In an aspect, preferably, the planetary gear mechanism, the first and second input-side transmission paths, and the first and second output-side transmission paths are configured that a rotational speed of the second element at the time when the output of the speed change output device is at the second-speed stage in the first-speed stage transmission state is substantially the same as the rotational speed of the second element at the time of the second-speed stage transmission state and that a rotational speed of the first element at the time of the first-speed stage transmission state is substantially the same as the rotational speed of the first element at the time when the output of the speed change output device is at the second-speed stage in the second-speed stage transmission state.

In another aspect, the main transmission unit comprising: a first-speed stage planetary gear mechanism and a second-speed stage planetary gear mechanism, each of which acts as the planetary gear mechanism; a first speed change transmission path, through which the transmission rotary power is transmitted to a sun gear of three planetary elements of the first-speed stage planetary gear mechanism; a first reference power transmission path, through which the reference rotary power is transmitted to a planetary element, which acts as a reference power input section, of a first element and a second element of the three planetary elements of the first-speed stage planetary gear mechanism; a first clutch mechanism that engages/disengages the first reference power transmission path; a first output-side transmission path, through which a planetary element, which forms a planetary output section, other than the sun gear and the planetary element forming the reference power input section of the three planetary elements of the first-speed stage planetary gear mechanism is interlocked to the travel intermediate shaft; a second speed change transmission path, through which the transmission rotary power is transmitted to a sun gear of three planetary elements of the second-speed stage planetary gear mechanism; a second reference power transmission path, through which the reference rotary power is transmitted to a planetary element, which acts as a reference power input section, of a first element and a second element of the three planetary elements of the second-speed stage planetary gear mechanism; a second clutch mechanism that engages/disengages the second reference power transmission path; and a second output-side transmission path, through which a planetary element, which forms a planetary output section, other than the sun gear and the planetary element forming the reference power input section of the three planetary elements of the second-speed stage planetary gear mechanism is interlocked to the travel intermediate shaft, realizes the first-speed stage transmission state by engagement of the first clutch mechanism, and realizes the second-speed stage transmission state by engagement of the second clutch mechanism, and the auxiliary transmission unit is arranged to perform multi-stage gear shifting between the travel intermediate shaft and the travel output shaft.

Advantageous Effects of Invention

The transmission structure according to the present invention can prevent or reduce a shock that can occur when the gear stage of the auxiliary transmission unit is switched during travel.

BRIEF DESCRIPTION OF DRAWINGS

FIG. 3A and FIG. 3B are graphs, each of which illustrates an example of a relationship between a manipulation position (a manipulation amount) of a main speed change manipulation member in the transmission structure and a target output speed (a target vehicle speed) of the transmission structure at a predetermined speed (for example, 2200 rpm) of an engine as a drive source;

DESCRIPTION OF EMBODIMENTS

Figure 1:
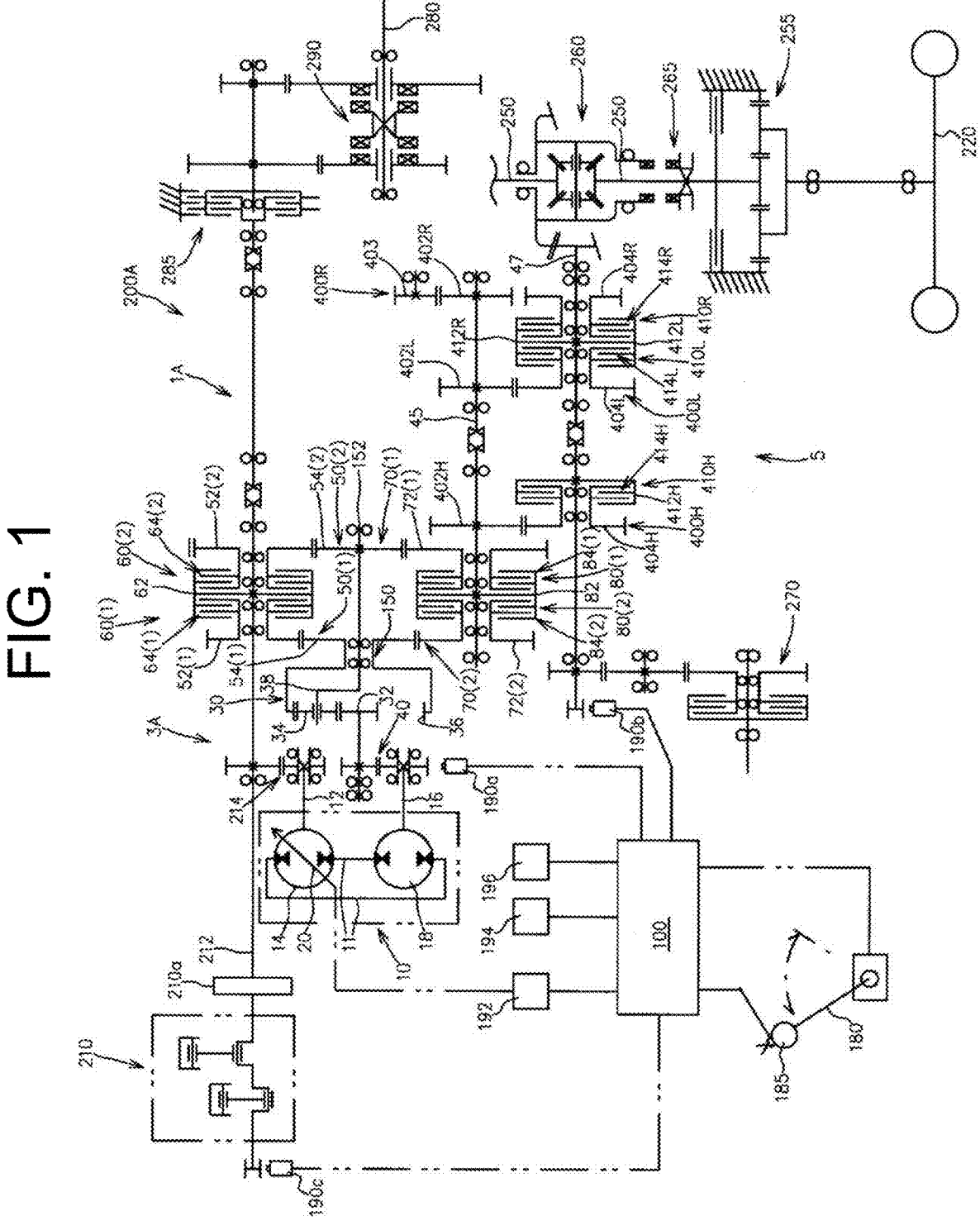
FIG. 1 is a view schematically illustrating power transmission in a work vehicle to which a transmission structure according to an embodiment of the present disclosure is applied.

Hereinafter, an embodiment of a transmission structure according to the present invention will be described with reference to the accompanying drawings. FIG. 1 is a view schematically illustrating power transmission in a work vehicle 200A to which a transmission structure 1A according to the present embodiment is applied.

As illustrated in FIG. 1, the work vehicle 200A includes a drive source 210, a drive shaft 212 that is operatively coupled to the drive source 210, drive wheels 220, a travel output shaft 47 that outputs travel rotary power toward the drive wheels 220, and the transmission structure 1A that continuously changes and transmits the rotary power from the drive shaft 212 to the travel output shaft 47. A fly wheel 210*a* in FIG. 1 is included in the drive source 210.

The work vehicle 200A has a pair of left and right main drive wheels as the drive wheels 220. Accordingly, as illustrated in FIG. 1, the work vehicle 200A further includes a pair of main drive axles 250 that respectively drive the pair of main drive wheels 220, and a differential mechanism 260 that differentially transmits the rotary power of the travel output shaft 47 to the pair of main drive axles 250.

As illustrated in FIG. 1, the work vehicle 200A further includes a travel brake mechanism 255 that selectively applies a braking force to the main drive axle 250, a differential lock mechanism 265 that directly couples the pair of main drive axles 250 and synchronously drives the pair of main drive axles 250 with respect to the rotary power of the travel output shaft 47, and an auxiliary drive wheel drive power takeoff mechanism 270 that can selectively output the rotary power of the travel output shaft 47 to auxiliary drive wheels.

Moreover, the work vehicle 200A has: a PTO shaft 280 that outputs the rotary power to the outside; and a PTO clutch mechanism 285 and a PTO multi-stage transmission mechanism 290 that are interposed in a PTO transmission path that extends from the drive source 210 to the PTO shaft 280.

As illustrated in FIG. 1, the transmission structure 1A includes: a main transmission unit 3A that includes a speed change output device and a planetary gear mechanism 30 and can continuously change reference rotary power from the drive source 210; an auxiliary transmission unit 5 that can change the travel rotary power from the main transmission unit 3A in multiple stages; a main speed change manipulation member 180 and an auxiliary speed change manipulation member 185 for respectively manipulating the main transmission unit 3A and the auxiliary transmission unit 5; and a controller 100. The main speed change manipulation member 180 and the auxiliary speed change manipulation member 185 are arranged near a driver's seat of the work vehicle 200A.

The speed change output device is configured to output transmission rotary power that is continuously changed at least between a first gear and a second gear.

The speed change output device is subjected to operation control by the controller 100.

As illustrated in FIG. 1, the transmission structure 1A according to the present embodiment includes an HST 10 as the speed change output device.

The HST 10 forms the HMT in cooperation with the planetary gear mechanism 30.

Here, the transmission structure 1A may include, as the speed change output device, that can output continuously variable rotation by a manual manipulation, instead of the HST 10.

As illustrated in FIG. 1, the HST 10 includes: a pump shaft 12 that is operatively and rotationally driven by the drive source 210; an HST pump 14 that is supported by the pump shaft 12 in a relatively non-rotatable manner thereto; an HST motor 18 that is fluidly connected to (forms a closed circuit with) the HST pump 14 via a pair of first and second HST lines 11 and hydraulically and rotationally driven by the HST pump 14; a motor shaft 16 that supports the HST motor 18 in a relatively non-rotatable manner; and an output adjustment member 20 capable of manually changing a volume of at least one of the HST pump 14 and the HST motor 18.

In the present embodiment, the HST pump 14 is configured to be able to discharge hydraulic oil in both directions, and is configured to be able to freely adjust an amount of the hydraulic oil that is discharged toward the first HST line 11 from zero to the maximum or an amount of the hydraulic oil discharged toward the second HST line 11 from zero to the maximum by the output adjustment member 20.

The HST 10 is configured to be able to continuously change a ratio of a rotational speed of HST output that is output from the motor shaft 16 to a rotational speed of the power that is input to the pump shaft 12 (that is, a gear ratio of the HST 10) according to an adjustment position of the output adjustment member 20.

That is, when the rotational speed of the rotary power that is operationally input from the drive source 210 to the pump shaft 12 is set as a reference input speed, the HST 10 continuously changes the rotary power at the reference input speed to the rotary power at least between the first gear and the second gear according to the adjustment position of the output adjustment member 20, and outputs the changed rotary power from the motor shaft 16. As described above, the first gear is established when the hydraulic oil that flows from the HST pump 14 to the HST motor 18 flows in from the first HST line 11. The second gear is established when the hydraulic oil flows in from the second HST line 11. A speed change output sensor 190*a* in FIG. 1 detects an output rotational speed of the speed change output device (the HST 10 in the present embodiment).

In the present embodiment, as illustrated in FIG. 1, the pump shaft 12 is coupled to the drive shaft 212, which is operatively coupled to the drive source 210, via an HST input gear train 214.

Figure 2:
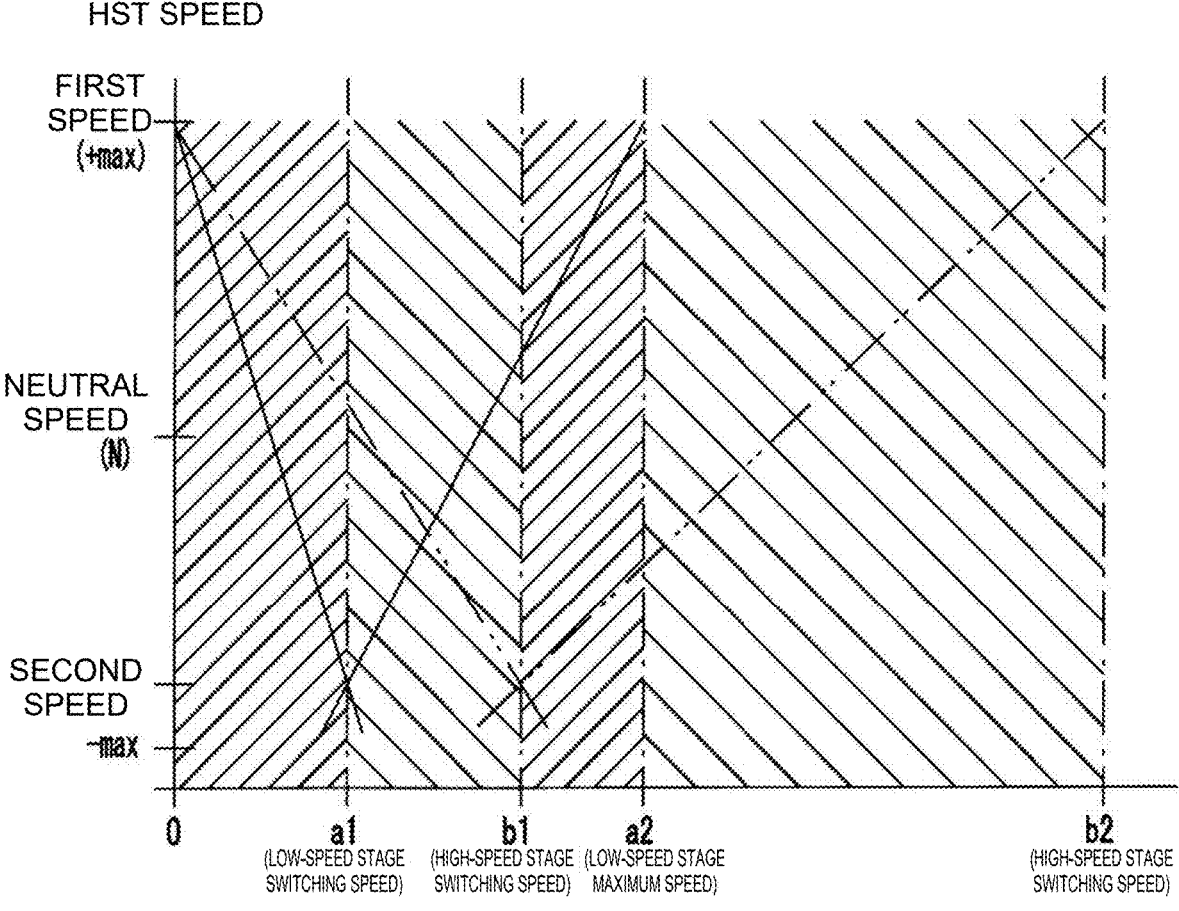
FIG. 2 is a graph illustrating a relationship between a rotational speed (a vehicle speed) of drive rotary power that is output by the transmission structure and an output rotational speed of an HST in the transmission structure.

FIG. 2 illustrates a relationship between the output rotational speed of the HST 10 and the rotational speed (the vehicle speed) of the drive rotary power in the transmission structure 1A.

Although details will be described below, the auxiliary transmission unit 5 can realize a high-speed stage state and a low-speed stage state. A solid line in FIG. 2 indicates a relationship between the HST output rotational speed and the vehicle speed in the low-speed stage state, and a two-dot chain line indicates a relationship between the HST output rotational speed and the vehicle speed in the high-speed stage state.

As illustrated in FIG. 2, in the present embodiment, the HST 10 can switch a rotational direction of the HST output between forward and reverse directions according to a direction in which the hydraulic oil is discharged from the HST pump 14.

That is, the HST 10 is configured to output the rotary power at the first gear (for example, the highest speed+max in the forward direction), at which the rotational direction is one of the forward and reverse directions (for example, the forward direction), from the motor shaft 16 when a rotational direction of the reference input speed is the forward direction and the output adjustment member 20 is located at a first adjustment position, and to output the rotary power at the second gear (for example, the highest speed-max in the reverse direction), at which the rotational direction is the other of the forward and reverse directions (for example, the reverse direction), from the motor shaft 16 when the output adjustment member 20 is located at the second adjustment position.

In this case, when the output adjustment member 20 is located at a neutral position between the first and second adjustment positions, the rotational speed of the HST output becomes a neutral speed (a zero speed).

In the present embodiment, the HST 10 includes, as the output adjustment member 20, a movable swash plate that changes a volume of the HST pump 14 by being tilted around a trunnion shaft, which is an axial piston pump in general. The movable swash plate can be tilted to one side or the other side around the trunnion shaft across the neutral position, at which the discharge amount discharged from the HST pump 14 is zero.

When the movable swash plate is located at the neutral position, the volume of the HST pump 14 becomes zero, and pressurized oil is no longer discharged therefrom. Thus, the HST 10 is brought into a neutral state where the output of the HST motor 18 is zero.

Then, when the movable swash plate swings from the neutral position to a forward side on one side around a swing axis, the pressurized oil is supplied from the HST pump 14 to one of the paired HST lines 11. For example, when the first HST line 11 on one side is on a high-pressure side and the second HST line 11 on the other side is on a low-pressure side, the HST motor 18 is rotationally driven to the forward side, and the HST 10 is brought into a forward output state.

On the contrary, when the movable swash plate swings from the neutral position to a reverse side on the other side around the swing axis, the pressurized oil is supplied from the HST pump 14 to the second HST line 11 as the other of the paired HST lines 11, the second HST line 11 is on the high-pressure side, and the first HST line 11 is on the low-pressure side. As a result, the HST motor 18 is rotationally driven to the reverse side, and the HST 10 is brought into a reverse output state.

In the present embodiment, the volume of the HST motor 18 is fixed by a fixed swash plate.

The output adjustment member 20 is controlled to a predetermined adjustment position by the controller 100 according to a manipulation of the main speed change manipulation member 180.

That is, as illustrated in FIG. 1, the transmission structure 1A according to the present embodiment has an HST speed change actuator 192 that operates the output adjustment member 20 to the predetermined adjustment position, and the controller 100 operates the output adjustment member 20 via the HST speed change actuator 192 according to the manipulation of the main speed change manipulation member 180.

The HST speed change actuator 192 can have any of various configurations, such as an electric motor and a hydraulic mechanism (for example, a hydraulic servo mechanism), as long as the operation thereof can be controlled by the controller 100.

As illustrated in FIG. 1, the planetary gear mechanism 30 has a sun gear 32, a planetary gear 34 that meshes with the sun gear 32, an internal gear 36 that meshes with the planetary gear 34, and a carrier 38 that supports the planetary gear 34 in a freely rotatable manner about an axis and rotates about an axis of the sun gear 32 in conjunction with revolution of the planetary gear 34 around the sun gear 32. The sun gear 32, the carrier 38, and the internal gear 36 form three planetary elements.

In the present embodiment, as illustrated in FIG. 1, the main transmission unit 3A further has the following in addition to the speed change output device and the planetary gear mechanism 30.

A speed change transmission path 40 through which the transmission rotary power is transmitted to a third element of the three planetary elements of the planetary gear mechanism 30

An input-side first transmission path 50(1) and an input-side second transmission path 50(2) that respectively transmit the reference rotary power to the first element and the second element of three planetary elements of the planetary gear mechanism 30

An input-side first clutch mechanism 60(1) and an input-side second clutch mechanism 60(2) that respectively engage/disengage the input-side first and second transmission paths 50(1), 50(2)

An output-side first transmission path 70(1) and an output-side second transmission path 70(2) through which the rotary power of the second element and the rotary power of the first element are respectively transmitted to a travel intermediate shaft 45 that is arranged between the drive shaft 212 and the travel output shaft 47 in a transmission direction An output-side first clutch mechanism 80(1) and an output-side second clutch mechanism 80(2) that respectively engage/disengage the output-side first and second transmission paths 70(1), 70(2)

In the present embodiment, the sun gear 32 is the third element, and acts as a variable power input section that inputs the transmission rotary power.

As described above, in the present embodiment, the HST 10 is provided as the speed change output device. Accordingly, as illustrated in FIG. 1, the speed change transmission path 40 is configured to operatively couple the motor shaft 16 to the sun gear 32.

In the present embodiment, the internal gear 36 is the first element, and the carrier 38 is the second element.

Thus, the input-side first transmission path 50(1) is configured to operatively couple the drive shaft 212 to the internal gear 36, and the input-side second transmission path 50(2) is configured to operatively couple the drive shaft 212 to the carrier 38.

As illustrated in FIG. 1, the transmission structure 1A according to the present embodiment includes: a first transmission shaft 150 that is operatively coupled to the first component (the internal gear 36); a second transmission shaft 152 that is operatively coupled to the second component (the carrier); an input-side first drive gear 52(1) that is supported by the drive shaft 212 in a manner to be freely rotatable relative thereto in a state of being operatively coupled to the first transmission shaft 150; and an input-side second drive gear 52(2) that is supported by the drive shaft 212 in a manner to be freely rotatable relative thereto in a state of being operatively coupled to the second transmission shaft 152.

In such a configuration, the input-side first drive gear 52(1) and the first transmission shaft 150 form the input-side first transmission path 50(1), and the input-side second drive gear 52(2) and the second transmission shaft 152 form the input-side second transmission path 50(2).

In the present embodiment, as illustrated in FIG. 1, the second transmission shaft 152 is arranged coaxially with the planetary gear mechanism 30, and the first transmission shaft 150 is externally inserted in the second transmission shaft 152 in a state of being freely rotatable relative thereto.

Here, as illustrated in FIG. 1 and FIG. 2, the transmission structure 1A according to the present embodiment further includes: an input-side first driven gear 54(1) that is supported by the first transmission shaft 150 in a relatively non-rotatable manner thereto and is operatively coupled to the input-side first drive gear 52(1); and an input-side second driven gear 54(2) that is supported by the second transmission shaft 152 in a relatively non-rotatable manner thereto and is operatively coupled to the input-side second drive gear 52(2).

The input-side first and second driven gears 54(1), 54(2) form parts of the input-side first and second transmission paths 50(1), 50(2), respectively.

The input-side first and second clutch mechanisms 60(1), 60(2) are respectively interposed in the input-side first and second transmission paths 50(1), 50(2).

As illustrated in FIG. 1, in the present embodiment, the input-side first and second clutch mechanisms 60(1), 60(2) are configured to engage/disengage power transmission from the drive shaft 212 to the input-side first and second drive gears 52(1), 52(2), respectively.

In the present embodiment, the input-side first and second clutch mechanisms 60(1), 60(2) are hydraulic friction plate clutches.

The input-side first and second clutch mechanisms 60(1) and 60(2) have a common clutch housing that is supported by the drive shaft 212 in a relatively non-rotatable manner.

In detail, the input-side first clutch mechanism 60(1) includes: an input-side common clutch housing 62; an input-side first friction plate group 64(1) including a first drive-side friction plate and a first driven-side friction plate, the first drive-side friction plate being supported by the input-side common clutch housing 62 in a relatively non-rotatable manner, and the first driven-side friction plate being supported by the input-side first drive gear 52(1) in a relatively non-rotatable manner in a state of opposing the first drive-side friction plate; and an input-side first piston (not illustrated) that frictionally engages the input-side first friction plate group 64(1).

The input-side second clutch mechanism 60(2) has: the input-side common clutch housing 62; an input-side second friction plate group 64(2) including a second drive-side friction plate and a second driven-side friction plate, the second drive-side friction plate being supported by the input-side common clutch housing 62 in a relatively non-rotatable manner, and the second driven-side friction plate being supported by the input-side second drive gear 52(2) in a relatively non-rotatable manner in a state of opposing the second drive-side friction plate; and an input-side third piston (not illustrated) that frictionally engages the input-side second friction plate group 64(2).

The output-side first transmission path 70(1) is configured to transmit the rotary power of the second element to the travel intermediate shaft 45, and the output-side second transmission path 70(2) is configured to transmit the rotary power of the first element to the travel intermediate shaft 45.

As illustrated in FIG. 1, the transmission structure 1A according to the present embodiment has: an output-side first gear 72(1) that is supported by the travel intermediate shaft 45 in a manner to be freely rotatable relative thereto in a state of being operatively coupled to the second transmission shaft 152; and an output-side second gear 72(2) that is supported by the travel intermediate shaft 45 in a manner to be freely rotatable relative thereto in a state of being operatively coupled to the first transmission shaft 150.

In the present embodiment, the output-side first gear 72(1) meshes with the input-side second driven gear 54(2) and is operatively coupled to the second transmission shaft 152 via the input-side second driven gear 54(2).

In such a configuration, the second transmission shaft 152, the input-side second driven gear 54(2), and the output-side first gear 72(1) form the output-side first transmission path 70(1).

That is, in the present embodiment, the input-side second driven gear 54(2) forms a part of the input-side second transmission path 50(2) and also forms a part of the output-side first transmission path 70(1).

In the present embodiment, the output-side second gear 72(2) meshes with the input-side first driven gear 54(1) and is operatively coupled to the first transmission shaft 150 via the input-side first driven gear 54(1).

In such a configuration, the first transmission shaft 150, the input-side first driven gear 54(1), and the output-side second gear 72(2) form the output-side second transmission path 70(2).

That is, in the present embodiment, the input-side first driven gear 54(1) forms a part of the input-side first transmission path 50(1) and also forms a part of the output-side second transmission path 70(2).

The output-side first and second clutch mechanisms 80(1), 80(2) are respectively interposed in the output-side first and second transmission paths.

As illustrated in FIG. 1, in the present embodiment, the output-side first and second clutch mechanisms 80(1), 80(2) are configured to engage/disengage power transmission from the output-side first and second gears 72(1), 72(2) to the travel intermediate shaft 45, respectively.

In the present embodiment, the output-side first and second clutch mechanisms 80(1), 80(2) are hydraulic friction plate clutches.

The output-side first and second clutch mechanisms 80(1), 80(2) have a common clutch housing that is supported by the intermediate shaft 45 in a relatively non-rotatable manner.

In detail, the output-side first clutch mechanism 80(1) has: an output-side common clutch housing 82 that is supported by the travel intermediate shaft 45 in a relatively non-rotatable manner; an output-side first friction plate group 84(1) including a first drive-side friction plate and a first driven-side friction plate, the first drive-side friction plate being supported by the output-side common clutch housing 82 in a relatively non-rotatable manner, and the first driven-side friction plate being supported by the output-side first gear 72(1) in a relatively non-rotatable manner in a state of opposing the first drive-side friction plate; and an output-side first piston (not illustrated) that frictionally engages the output-side first friction plate group 84(1).

The output-side second clutch mechanism 80(2) has: the output-side common clutch housing 82; an output-side second friction plate group 84(2) including a second drive-side friction plate and a second driven-side friction plate, the second drive-side friction plate being supported by the output-side common clutch housing 82 in a relatively non-rotatable manner, and the second driven-side friction plate being supported by the output-side second gear 72(2) in a relatively non-rotatable manner in a state of opposing the second drive-side friction plate; and an output-side second piston (not illustrated) that frictionally engages the output-side second friction plate group 84(2).

The transmission structure 1A further has main speed change transmission state switching actuator 194 that switches the engagement/disengagement of the input-side first and second clutch mechanisms 60(1), 60(2) and the output-side first and second clutch mechanisms 80(1), 80(2).

The main speed change transmission state switching actuator 194 can have any of various configurations, such as an electric motor and a hydraulic mechanism, as long as operation thereof can be controlled by the controller 100.

The auxiliary transmission unit 5 has: a low-speed stage transmission path 400L and a high-speed stage transmission path 400H that respectively transmit the rotary power of the travel intermediate shaft 45 to the travel output shaft 47 at a forward-side low-speed gear ratio and a forward-side high-speed gear ratio; and a low-speed stage clutch mechanism 410L and a high-speed stage clutch mechanism 410H that respectively engage/disengage the low-speed stage and high-speed stage transmission paths 400L, 400H.

As illustrated in FIG. 1, the low-speed stage transmission path 400L has: a low-speed stage drive gear 402L that is supported by the travel intermediate shaft 45; and a low-speed stage driven gear 404L that meshes with the low-speed stage drive gear 402L while being supported by the travel output shaft 47.

In the present embodiment, the low-speed stage drive gear 402L is supported by the travel intermediate shaft 45 in a relatively non-rotatable manner, and the low-speed stage driven gear 404L is supported by the travel output shaft 47 in a manner to be freely rotatable relative thereto.

As illustrated in FIG. 1, the high-speed stage transmission path 400H has: a high-speed stage drive gear 402H that is supported by the travel intermediate shaft 45; and a high-speed stage driven gear 404H that meshes with the high-speed stage drive gear 402H in a state of being supported by the travel output shaft 47.

In the present embodiment, the high-speed stage drive gear 402H is supported by the travel intermediate shaft 45 in a relatively non-rotatable manner, and the high-speed stage driven gear 404H is supported by the travel output shaft 47 in a manner to be freely rotatable relative thereto.

The low-speed stage clutch mechanism 410L and the high-speed stage clutch mechanism 410H are supported by the travel output shaft 47 in a manner to engage/disengage the low-speed stage driven gear 404L and the high-speed stage driven gear 404H with/from the travel output shaft 47, respectively.

In the present embodiment, the low-speed stage clutch mechanism 410L and the high-speed stage clutch mechanism 410H are hydraulic friction plate clutches.

The low-speed stage clutch mechanism 410L has: a low-speed stage clutch housing 412L that is supported by the travel output shaft 47 in a relatively non-rotatable manner; a low-speed stage friction plate group 414L including a low-speed stage driven-side friction plate and a low-speed stage drive-side friction plate, the low-speed stage driven-side friction plate being supported by the low-speed stage clutch housing 412L in a relatively non-rotatable manner, and the low-speed stage drive-side friction plate being supported by the low-speed stage driven gear 404L in a relatively non-rotatable manner in a state of opposing the low-speed stage driven-side friction plate; and a low-speed stage piston (not illustrated) that frictionally engages the low-speed stage friction plate group 414L.

The high-speed stage clutch mechanism 410H has: a high-speed stage clutch housing 412H that is supported by the travel output shaft 47 in a relatively non-rotatable manner; a high-speed stage friction plate group 414H including a high-speed stage driven-side friction plate and a high-speed stage drive-side friction plate, the high-speed stage driven-side friction plate being supported by the high-speed stage clutch housing 412H in a relatively non-rotatable manner, and the high-speed stage drive-side friction plate being supported by the high-speed stage driven gear 404H in a relatively non-rotatable manner in a state of opposing the high-speed stage driven-side friction plate; and a high-speed stage piston (not illustrated) that frictionally engages the high-speed stage friction plate group 414H.

In the present embodiment, the auxiliary transmission unit 5 can realize a reverse state in addition to the high-speed stage state and the low-speed stage state.

More specifically, the auxiliary transmission unit 5 further has: a reverse transmission path 400R through which the rotary power of the travel intermediate shaft 45 is transmitted as a reverse drive power to the travel output shaft 47; and a reverse clutch mechanism 410R that engages/disengages the reverse transmission path 400R.

The reverse transmission path 400R has a reverse drive gear 402R that is supported by the travel intermediate shaft 45, and a reverse driven gear 404R that meshes with the reverse drive gear 402R via an idle gear 403 (see FIG. 1) while being supported by the travel output shaft 47.

In the present embodiment, the reverse drive gear 402R is supported by the travel intermediate shaft 45 in a relatively non-rotatable manner, and the reverse driven gear 404R is supported by the travel output shaft 47 in a manner to be freely rotatable relative thereto.

The reverse clutch mechanism 410R has: a reverse clutch housing 412R; a reverse friction plate group 414R including a reverse driven-side friction plate and a reverse drive-side friction plate, the reverse driven-side friction plate being supported by the reverse clutch housing 412R in a relatively non-rotatable manner, and the reverse drive-side friction plate being supported by the reverse driven gear 404R in a relatively non-rotatable manner in a state of opposing the reverse driven-side friction plate; and a reverse-side piston (not illustrated) that frictionally engages the reverse friction plate group 414R.

In the present embodiment, the reverse clutch housing 412R is formed integrally with the low-speed stage clutch housing 412L.

As illustrated in FIG. 1, the transmission structure 1A further has an auxiliary speed change transmission state switching actuator 196 that switches engagement/disengagement of the low-speed stage clutch mechanism 410L and the high-speed stage clutch mechanism 410H.

In the present embodiment, the auxiliary speed change transmission state switching actuator 196 is configured to also switch engagement/disengagement of the reverse clutch mechanism 410R.

The auxiliary speed change transmission state switching actuator 196 can have any of various configurations, such as an electric motor and a hydraulic mechanism, as long as operation thereof can be controlled by the controller 100.

The controller 100 governs operation control of the main transmission unit 3A and the auxiliary transmission unit 5.

More specifically, the controller 100 is configured to control the operation of the auxiliary transmission unit 5 to realize the low-speed stage state by the engagement of the low-speed stage clutch mechanism 410L and the high-speed stage state by the high-speed stage clutch mechanism 410H according to the manipulation of the auxiliary speed change manipulation member 185, and further to control the operation of the speed change output device (the HST 10 in the present embodiment) according to the manipulation of the main speed change manipulation member 180 while controlling the operation of the input-side first and second clutch mechanisms 60(1), 60(2) and the output-side first and second clutch mechanisms 80(1), 80(2) according to the vehicle speed.

In the present embodiment, the controller 100 also controls the operation of the auxiliary transmission unit 5 to realize the reverse state by the engagement of the reverse clutch mechanism 410R according to a manipulation of a forward/reverse switching member.

Here, gear ratios of the input-side first and second transmission paths 50(1), 50(2), the planetary gear mechanism 30, and the output-side first and second transmission paths 70(1), 70(2) are set as follows.

In a first-speed stage transmission state that is realized by bringing the input-side first clutch mechanism 60(1) and the output-side first clutch mechanism 80(1) into the engaged states and bringing the input-side second clutch mechanism 60(2) and the output-side second clutch mechanism 80(2) into the disengaged states, the rotary power of the drive shaft 212 is transmitted to the travel intermediate shaft 45 via the input-side first transmission path 50(1), the planetary gear mechanism 30, and the output-side first transmission path 70(1).

In this first-speed stage transmission state, the first element (the internal gear 36 in the present embodiment) of the planetary gear mechanism 30 acts as a reference power input section that inputs the reference rotary power from the drive shaft 212, and the second element (the carrier 38 in the present embodiment) thereof acts as a combined power output section that outputs the travel rotary power toward the travel intermediate shaft 45.

As illustrated in FIG. 2, the input-side first transmission path 50(1) and the output-side first transmission path 70(1), which are power transmission paths in this first-speed stage transmission state, and the planetary gear mechanism 30 are set such that, when the output of the speed change output device (the HST 10 in the present embodiment) is at the first gear, the rotational speed of the second element (that is, the rotational speed of the travel output shaft 47) becomes the lowest speed and the rotational speed of the second element (that is, the rotational speed of the travel intermediate shaft 45) is increased as the output of the speed change output device is changed from the first gear toward the second gear.

In a second-speed stage transmission state that is realized by bringing the input-side second clutch mechanism 60(2) and the output-side second clutch mechanism 80(2) into the engaged states and bringing the input-side first clutch mechanism 60(1) and the output-side first clutch mechanism 80(1) into the disengaged states, the rotary power of the drive shaft 212 is transmitted to the travel intermediate shaft 45 via the input-side second transmission path 50(2), the planetary gear mechanism 30, and the output-side second transmission path 70(2).

In this second-speed stage transmission state, the second element of the planetary gear mechanism 30 acts as the reference power input section, and the first element thereof acts as the combined power output section.

Here, the input-side first and second transmission paths 50(1), 50(2), the planetary gear mechanism 30, and the output-side first and second transmission paths 70(1), 70(2) are set such that the rotational speed of the second element at the time when the output of the speed change output device is set at the second gear in the first-speed stage transmission state is substantially the same as the rotational speed of the second element that is rotationally driven by the drive power transmitted via the input-side second transmission path 50(2) in the second-speed stage transmission state and further that the rotational speed of the first element that is rotationally driven by the drive power transmitted via the input-side first transmission path 50(1) in the first-speed stage transmission state is substantially the same as the rotational speed of the first element at the time when the output of the speed change output device is set at the second gear in the second-speed stage transmission state.

Here, "substantially the same" includes not only a case where a state thereof is achieved by each of the transmission paths 50(1), 50(2), 70(1), 70(2) and the strictly setting of the gear ratio of the planetary gear mechanism 30 but also a state where there is a difference in the rotational speed that can be absorbed by a slip between the friction plates at the time when the members forming travel system transmission paths, such as the hydraulic friction plate clutches, which will be described below, are engaged.

As illustrated in FIG. 2, a speed change available range of the first element that functions as the combined power output section in this second-speed stage transmission state is a higher speed range than a speed change available range of the second element that functions as the combined power output section in the first-speed stage transmission state. In the second-speed stage transmission state, as the output of the speed change output device is changed from the second gear to the first gear, the rotational speed of the first element (that is, the rotational speed of the travel intermediate shaft 45) is increased.

As illustrated in FIG. 2, the controller 100 changes the rotational speeds of the first element and the second element in the following manner according to the vehicle speed that is recognized on the basis of a vehicle speed sensor 190b or an engine speed sensor 190c and a speed change output sensor 190a (see FIG. 1).

1. When an absolute value of the vehicle speed falls within a range up to a switching speed (that is, a range up to a low-speed stage switching speed a1 when the auxiliary transmission unit 5 is in the low-speed stage state, and a range up to a high-speed stage switching speed b1 when the auxiliary transmission unit 5 is in the high-speed stage state), the controller 100 changes the output of the speed change output device to the first gear and changes the rotational speed of the second element to the lowest speed when the main speed change manipulation member 180 is manipulated at a lowest speed position (a manipulation amount 0% position) while establishing the first-speed stage transmission state, and changes the output of the speed change output device to the second gear side according to a speed increasing manipulation of the main speed change manipulation member 180 to increase the rotational speed of the second element.

2. When the absolute value of the vehicle speed falls within a range from the switching speed to the highest speed (that is, a range from the low-speed stage switching speed a1 to a low-speed stage highest speed a2 in the low-speed stage state of the auxiliary transmission unit 5, a range from the high-speed stage switching speed b1 to a high-speed stage highest speed b2 in the high-speed stage state of the auxiliary transmission unit 5), the controller 100 changes the output of the speed change output device toward the first gear side according to the speed increasing manipulation of the main speed change manipulation member 180 to increase the rotational speed of the first element while establishing the second-speed stage transmission state.

FIG. 3A and FIG. 3B are a graph and a table, respectively, each of which illustrates an example of a relationship between the manipulation position (a manipulation amount) of the main speed change manipulation member 180 and a target vehicle speed at the time when the engine acting as the drive source 210 is set to a predetermined speed (for example, 2200 rpm).

In the example illustrated in FIG. 3A and FIG. 3B, the auxiliary transmission unit 5 can set the gear ratio in the high-speed stage state as twice the gear ratio in the low-speed stage state.

More specifically, the target vehicle speed at the time when the main speed change manipulation member 180 is located at the lowest speed position (the manipulation amount 0%) is 2 Km/h in the low-speed stage state and 4 Km/h in the high-speed stage state, and the target vehicle speed at the time when the main speed change manipulation member 180 is located at the highest speed position (the manipulation amount 100%) is 20 Km/h in the low-speed stage state and 40 Km/h in the high-speed stage state.

The transmission structure 1A according to the present embodiment has the following configuration so that the gear stage switching operation of the auxiliary transmission unit 5, which corresponds to the manipulation of the auxiliary speed change manipulation member 185, in a vehicle travel state (that is, a state where the travel output shaft 47 is rotationally driven) can be performed in a state where a speed change shock is prevented or reduced as much as possible.

First, a description will be made on the gear stage switching operation of the auxiliary transmission unit 5 during the travel of the vehicle whose speed is equal to or lower than the low-speed stage switching speed a1, and, as an example (hereinafter referred to as a first embodiment), on a case where the auxiliary speed change manipulation member 185 is manipulated from a high-speed stage selection state to the low-speed stage selection state during the travel of the vehicle in the state where the main speed change manipulation member 180 is manipulated to the position at which the manipulation amount is 10%.

Figure 4:
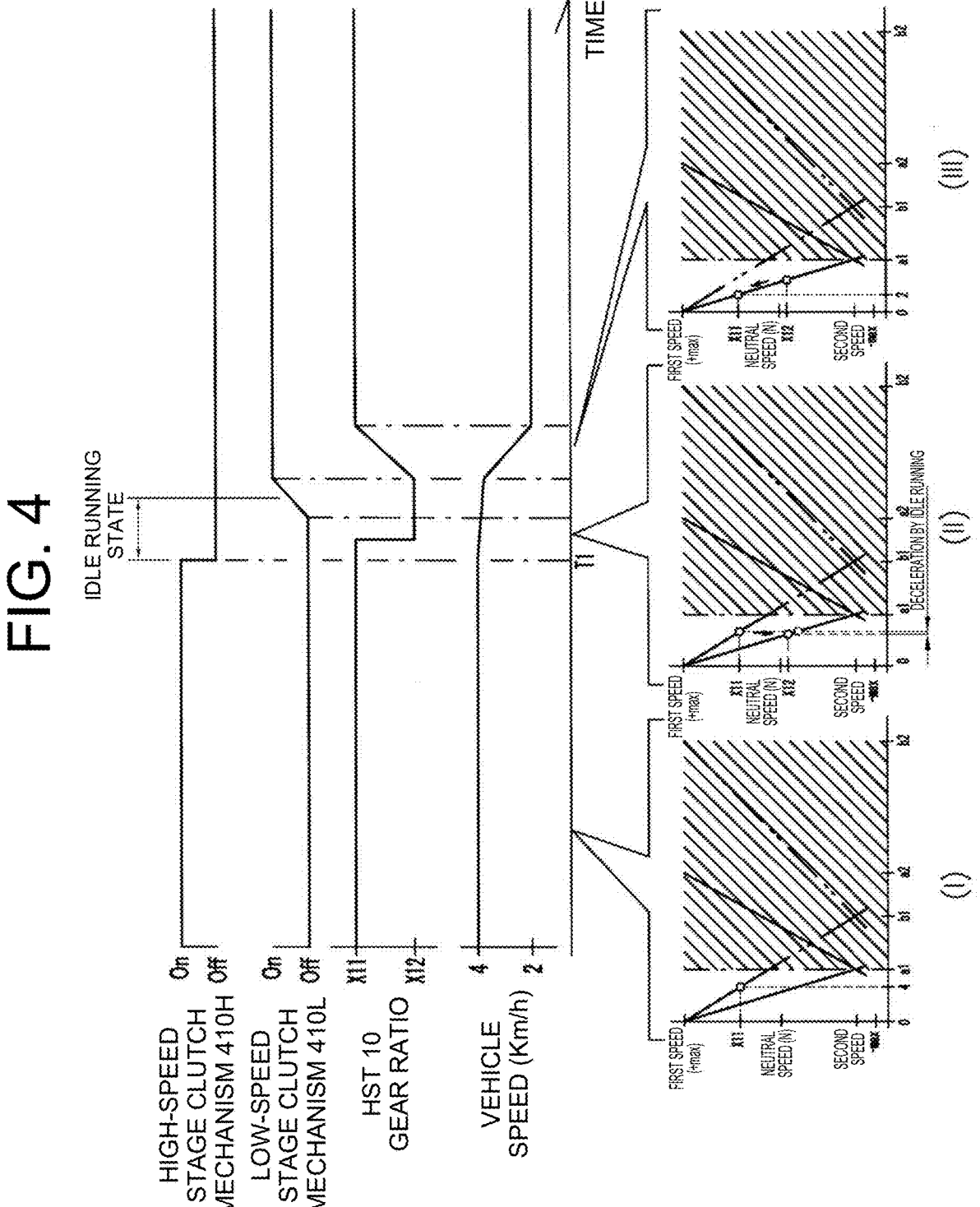
FIG. 4 is a graph illustrating a relationship between a time lapse and each of engaged/disengaged states of high-speed stage and low-speed stage clutch mechanisms, an output state of a speed change output device (a speed change state of the HST), and the vehicle speed (a rotational speed of a travel output shaft) in the first embodiment of the transmission structure.

FIG. 4 illustrates a relationship between a time lapse and each of the engaged/disengaged states of the high-speed stage clutch mechanism 410H and the low-speed stage clutch mechanism 410L, the output state of the speed change output device (the speed change state of the HST 10), and the vehicle speed (the rotational speed of the travel output shaft 47) in the first embodiment. A relationship between the manipulation position (the manipulation amount) of the main speed change manipulation member 180 and the vehicle speed is as illustrated in the example in FIG. 3A and FIG. 3B.

The target vehicle speed (4 km/h) at the time when the main speed change manipulation member 180 is manipulated to the position at which the manipulation amount is 10% in the high-speed stage state is equal to or lower than the high-speed stage switching speed b1 (14 km/h in this example). Accordingly, the controller 100 controls the operation of the speed change output device to realize the first-speed stage transmission state and obtain the target vehicle speed (4 km/h) in the first-speed stage transmission state. In the first embodiment, the controller 100 controls the operation of the HST 10 to an output state (a gear ratio X11) where the target vehicle speed is obtained (see (I) in FIG. 4).

In this state, when the auxiliary speed change manipulation member 185 is manipulated from the high-speed stage selection state to the low-speed stage selection state at time T1, the controller 100 shifts the pre-switching engagement clutch mechanism (the high-speed stage clutch mechanism 410H in the first embodiment), which has been engaged before the switching manipulation of the auxiliary speed change manipulation member 185, of the low-speed stage and high-speed stage clutch mechanisms 410L, 410H, to the disengaged state, so as to realize an idle running state where the power transmission from the drive source 210 to the travel output shaft 47 is cut off.

Next, during the idle running state, the controller 100 controls the operation of the speed change output device in a manner to obtain the vehicle speed that corresponds to the actual vehicle speed at the time in a post-switching gear state (the low-speed stage state in the first embodiment) that is realized by a post-switching engagement clutch mechanism (the low-speed stage clutch mechanism 410L in the first embodiment), which should be engaged after the switching manipulation of the auxiliary speed change manipulation member 185, of the low-speed stage and high-speed stage clutch mechanisms 410L, 410H. In the first embodiment, the controller 100 controls the operation of the HST 10 to an output state (a gear ratio X12) where the actual vehicle speed is obtained (see (II) in FIG. 4).

In the idle running state, since the power transmission from the drive source 210 to the travel output shaft 47 is cut off, the vehicle speed is changed according to a travel situation (is gradually decelerated in the first embodiment).

The controller 100 is configured to thereafter shift the post-switching engagement clutch mechanism (the low-speed stage clutch mechanism 410L in the first embodiment) to the engaged state and to control the operation of the speed change output device in the post-switching gear state (the low-speed stage state in the first embodiment) with the vehicle speed that is defined by the manipulation position of the main speed change manipulation member 180 at the time as the target vehicle speed.

In the first embodiment, the manipulation position (the manipulation amount) of the main speed change manipulation member 180 is not changed (is maintained with the manipulation amount of 10%) before and after the manipulation of the auxiliary speed change manipulation member 185. Thus, the controller 100 controls the operation of the HST 10 to the output state (the gear ratio X11) before the switching manipulation of the auxiliary speed change manipulation member 185 (see (III) in FIG. 4).

As a result, the vehicle speed is smoothly shifted to the target vehicle speed (2 km/h) at the time when the main speed change manipulation member 180 is manipulated to the position at which the manipulation amount is 10% in the low-speed stage state.

Next, a description will be made on the gear stage switching operation of the auxiliary transmission unit 5 during the travel of the vehicle whose speed is equal to or higher than the low-speed stage switching speed a1 (7 km/h in this example) and is equal to or lower than the high-speed stage switching speed b1 (14 km/h in this example), and, as an example (hereinafter referred to as a second embodiment), a case where the auxiliary speed change manipulation member 185 is manipulated from the low-speed stage selection state to the high-speed stage selection state during the travel of the vehicle in a state where the main speed change manipulation member 180 is manipulated to the position at which the manipulation amount is 30%.

Figure 5:
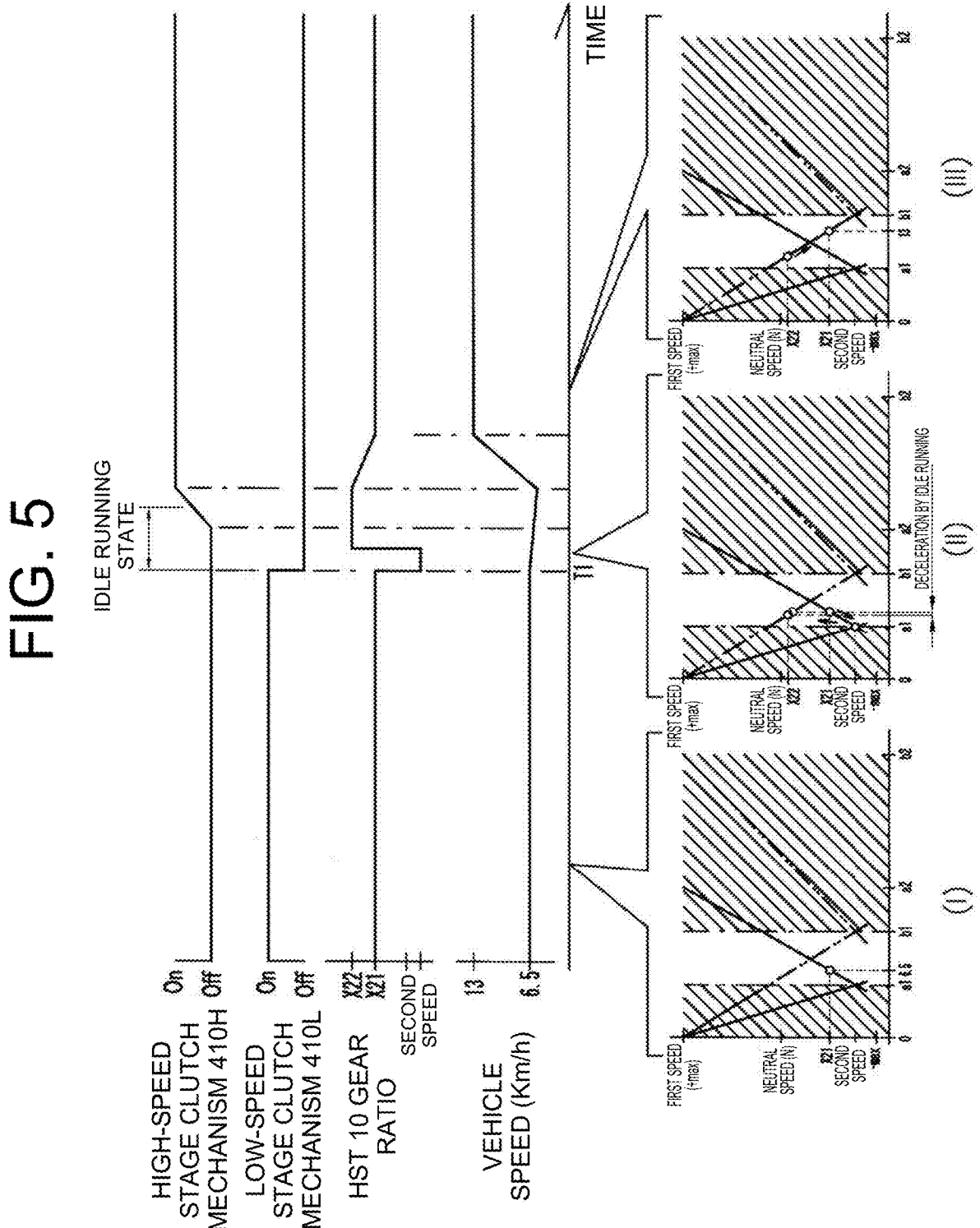
FIG. 5 is a graph illustrating a relationship between the time lapse and each of the engaged/disengaged states of the high-speed stage and low-speed stage clutch mechanisms, the output state of the speed change output device (the speed change state of the HST), and the vehicle speed (the rotational speed of the travel output shaft) in a second embodiment of the transmission structure.

FIG. 5 illustrates a relationship between the time lapse and each of the engaged/disengaged states of the high-speed stage clutch mechanism 410H and the low-speed stage clutch mechanism 410L, the output state of the speed change output device (the speed change state of the HST 10), and the vehicle speed (the rotational speed of the travel output shaft 47) in the second embodiment. A relationship between the manipulation position (the manipulation amount) of the main speed change manipulation member 180 and the vehicle speed is as illustrated in the example in FIG. 3A and FIG. 3B.

The target vehicle speed (6.5 km/h) at the time when the main speed change manipulation member 180 is manipulated to the position at which the manipulation amount is 30% in the low-speed stage state is equal to or higher than the low-speed stage switching speed a1. Accordingly, the controller 100 controls the operation of the speed change output device to realize the second-speed stage transmission state and obtain the target vehicle speed (6.5 km/h) in the second-speed stage transmission state. In the second embodiment, the controller 100 controls the operation of the HST 10 to an output state (a gear ratio X21) where the target vehicle speed is obtained (see (I) in FIG. 5).

In this state, when the auxiliary speed change manipulation member 185 is manipulated from the low-speed stage selection state to the high-speed stage selection state at time T1, the controller 100 shifts the pre-switching engagement clutch mechanism (the low-speed stage clutch mechanism 410L in the second embodiment), which has been engaged before the switching manipulation of the auxiliary speed change manipulation member 185, of the low-speed stage and high-speed stage clutch mechanisms 410L, 410H, to the disengaged state, so as to realize the idle running state where the power transmission from the drive source 210 to the travel output shaft 47 is cut off.

In the second embodiment, it is necessary to change the gear stage of the main transmission unit 3A at the time of the gear stage switching operation of the auxiliary transmission unit 5. In this regard, the transmission structure 1A according to the present embodiment has the following configuration.

That is, during the idle running state, the controller 100 controls the operation of the speed change output device in a manner to obtain the switching speed (the low-speed stage switching speed a1 in the second embodiment) in a pre-switching gear state (the low-speed stage state in the second embodiment) that has been realized by the pre-switching engagement clutch mechanism (the low-speed stage clutch mechanism 410L in the second embodiment) during the idle running state. In the second embodiment, the controller 100 controls the operation of the HST 10 to the output state (the second gear in the second embodiment) where the low-speed stage switching speed a1 is obtained (see (II) in FIG. 5).

Figure 6:
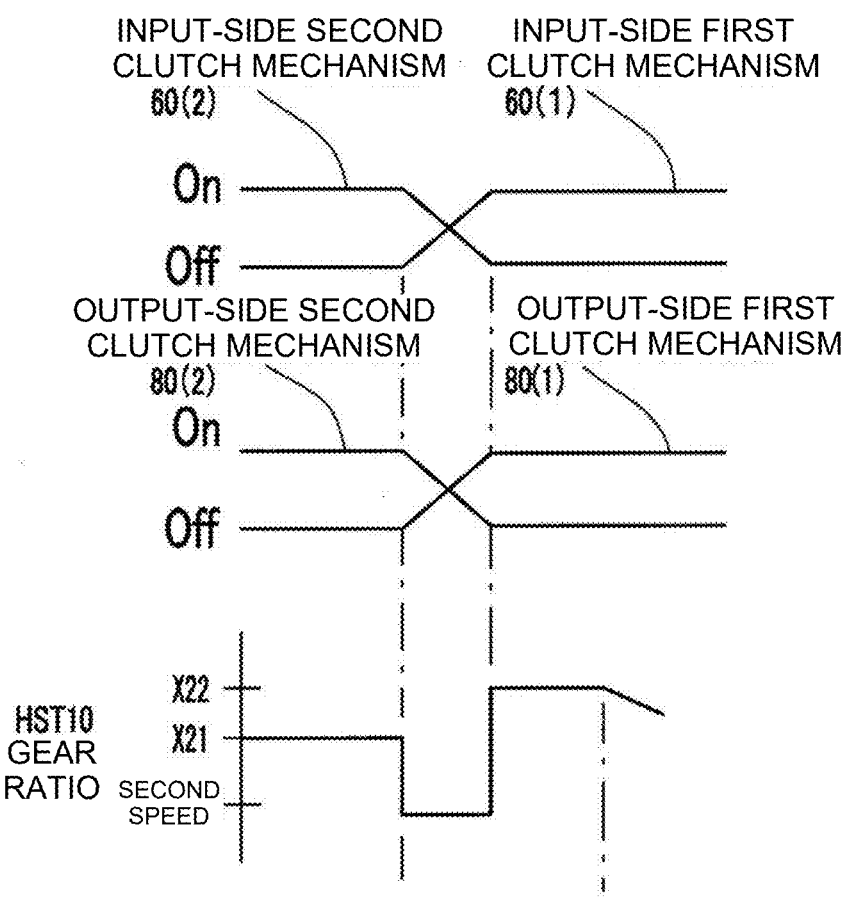
FIG. 6 is a graph illustrating a relationship between each of engaged/disengaged states of input-side first and second clutch mechanisms and output-side first and second clutch mechanisms and the output state of the speed change output device (the speed change state of the HST) in an idle running state period in the second embodiment.

FIG. 6 illustrates a relationship between each of the engaged/disengaged states of the input-side first and second clutch mechanisms 60(1), 60(2) and the output-side first and second clutch mechanisms 80(1), 80(2) and the output state of the speed change output device (the speed change state of the HST 10) in an idle running state period in the second embodiment.

The controller 100 determines which of the first-speed stage transmission state and the second-speed stage transmission state the transmission state, where the switching speed can be obtained in the post-switching gear state, is. In the second embodiment, the transmission state for realizing the switching speed (the low-speed stage switching speed a1 in the second embodiment) in the post-switching gear state (the high-speed stage state in the second embodiment) is the first-speed stage transmission state.

Accordingly, the controller 100 controls the operation of the input-side first and second clutch mechanisms 60(1), 60(2) and the output-side first and second clutch mechanisms 80(1), 80(2) such that the transmission state of the main transmission unit 3A becomes the first-speed stage transmission state, which is the transmission state for realizing the low-speed stage switching speed a1 in the high-speed stage state.

More specifically, as illustrated in FIG. 6, the controller 100 shifts each of the input-side first clutch mechanism 60(1) and the output-side first clutch mechanism 80(1) for establishing the pre-switching gear state of the auxiliary transmission unit 5 from the engaged state to the disengaged state, and shifts the input-side second clutch mechanism 60(2) and the output-side second clutch mechanism 80(2) for realizing the gear state, which should be realized after switching of the auxiliary transmission unit 5, from the disengaged state to the engaged state while the speed change output device is in the output state for realizing the low-speed stage switching speed a1 (that is, while the HST 10 is at the second gear).

Furthermore, as illustrated in FIG. 5, the controller 100 controls the operation of the speed change output device to obtain the vehicle speed that corresponds to the actual vehicle speed at the time in the post-switching gear state (the high-speed stage state in the second embodiment) realized by the post-switching engagement clutch mechanism (the high-speed stage clutch mechanism 410H in the second embodiment), which should be engaged after the switching manipulation of the auxiliary speed change manipulation member 185, of the low-speed stage and high-speed stage clutch mechanisms 410L, 410H.

In the second embodiment, the controller 100 controls the operation of the HST 10 to the output state (a gear ratio X22) where the actual vehicle speed is obtained (see (II) in FIG. 5).

In the idle running state, since the power transmission from the drive source 210 to the travel output shaft 47 is cut off, the vehicle speed is changed (is gradually decelerated in the second embodiment) according to the travel situation.

The controller 100 is configured to thereafter shift the post-switching engagement clutch mechanism (the high-speed stage clutch mechanism 410H in the second embodiment) to the engaged state and to control the operation of the speed change output device in the post-switching gear state (the high-speed stage state in the second embodiment) with the vehicle speed that is defined by the manipulation position of the main speed change manipulation member 180 at the time as the target vehicle speed.

In the second embodiment, the manipulation position (the manipulation amount) of the main speed change manipulation member 180 is not changed (is held with the manipulation amount of 30%) before and after the manipulation of the auxiliary speed change manipulation member 185, and thus, the controller 100 controls the operation of the HST 10 to the output state (the gear ratio X21) (see (III) in FIG. 5).

As a result, the vehicle speed is smoothly shifted to the target vehicle speed (13 km/h) at the time when the main speed change manipulation member 180 is manipulated to the position with the manipulation amount of 30% in the high-speed stage state.

In addition, it is configured to switch between the first and second-speed stage transmission states after the power from the speed change output device is changed such that the output state of the main transmission unit 3A becomes the output state corresponding to the switching speed (the low-speed stage switching speed a1 in the second embodiment) in the engaged gear state at the time. Thus, it is possible to reduce a burden on the components of the main transmission unit 3A as much as possible.

Next, a description will be made on the gear stage switching operation of the auxiliary transmission unit 5 during the travel of the vehicle whose speed is equal to or higher than the high-speed stage switching speed b1 (14 km/h in this example) and is equal to or lower than the low-speed stage highest speed a2 (20 km/h in this example), and, as an example (hereinafter referred to as a third embodiment), a case where the auxiliary speed change manipulation member 185 is manipulated from the low-speed stage selection state to the high-speed stage selection state during the travel of the vehicle in a state where the main speed change manipulation member 180 is manipulated to the position at which the manipulation amount is 70%.

Figure 7:
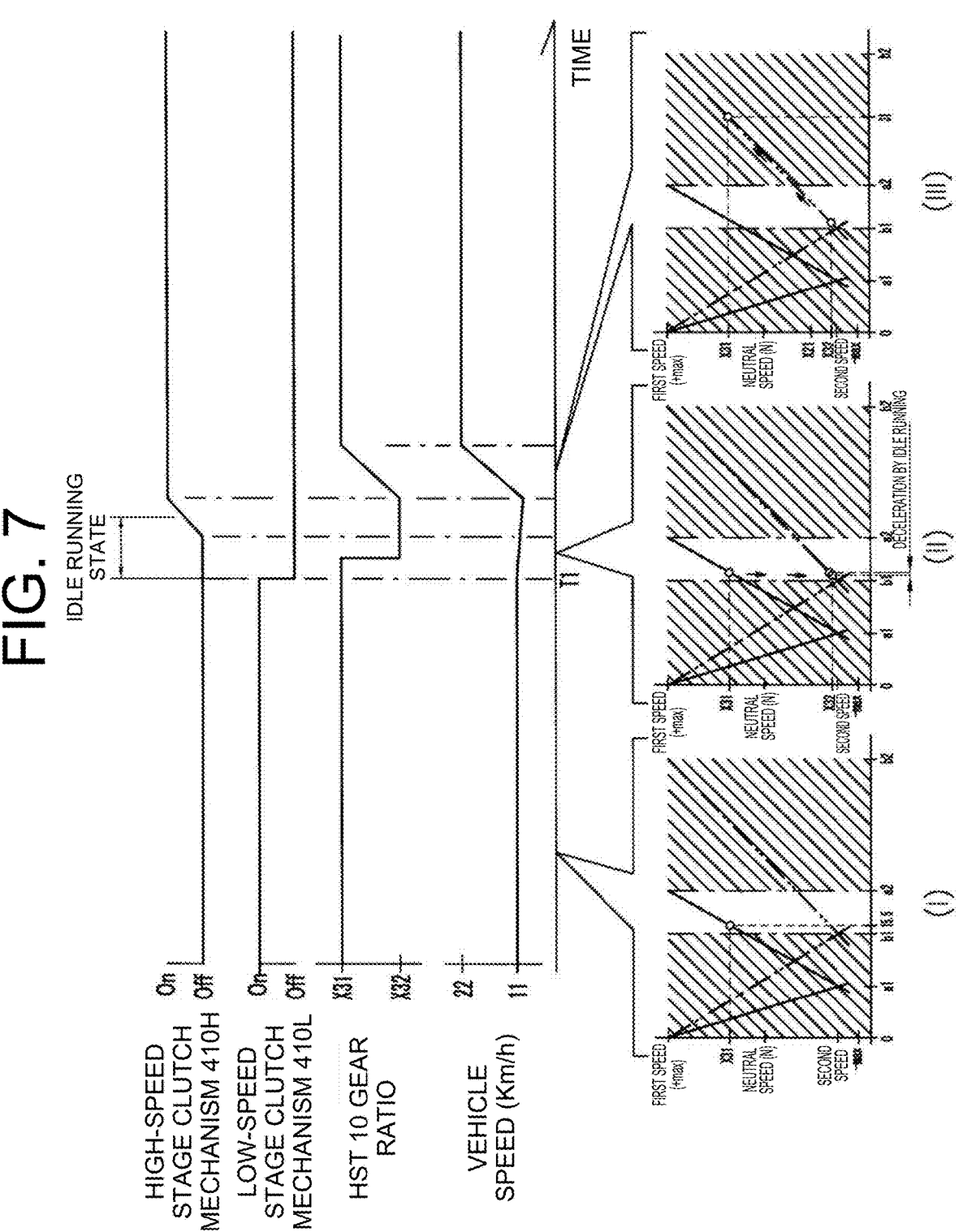
FIG. 7 is a graph illustrating a relationship between the time lapse and each of the engaged/disengaged states of the high-speed stage and low-speed stage clutch mechanisms, the output state of the speed change output device (the speed change state of the HST), and the vehicle speed (the rotational speed of the travel output shaft) in a third embodiment of the transmission structure.

FIG. 7 illustrates a relationship between the time lapse and each of the engaged/disengaged states of the high-speed stage clutch mechanism 410H and the low-speed stage clutch mechanism 410L, the output state of the speed change output device (the speed change state of the HST 10), and the vehicle speed (the rotational speed of the travel output shaft 47) in the third embodiment. The relationship between the manipulation position (the manipulation amount) of the main speed change manipulation member 180 and the vehicle speed is as illustrated in the example in FIG. 3A and FIG. 3B.

The target vehicle speed (15.5 km/h) at the time when the main speed change manipulation member 180 is manipulated to the position at which the manipulation amount is 70% in the low-speed stage state is equal to or higher than the high-speed stage switching speed b1 (14 km/h in this example) and is the highest speed (20 km/h in this example) in the low-speed stage state. Accordingly, the controller 100 controls the operation of the speed change output device to realize the second-speed stage transmission state and obtain the target vehicle speed (15.5 km/h) in the second-speed stage transmission state.

In the third embodiment, the controller 100 controls the operation of the HST 10 to the output state (a gear ratio X31) where the target vehicle speed is obtained (see (I) in FIG. 7).

In this state, when the auxiliary speed change manipulation member 185 is manipulated from the low-speed stage selection state to the high-speed stage selection state at the time T1, the controller 100 shifts the pre-switching engagement clutch mechanism (the low-speed stage clutch mechanism 410L in the third embodiment), which has been engaged before the switching manipulation of the auxiliary speed change manipulation member 185, of the low-speed stage and high-speed stage clutch mechanisms 410L, 410H, to the disengaged state, so as to realize the idle running state where the power transmission from the drive source 210 to the travel output shaft 47 is cut off.

Next, during the idle running state, the controller 100 controls the operation of the speed change output device in a manner to obtain the vehicle speed that corresponds to the actual vehicle speed at the time in the post-switching gear state (the high-speed stage state in the third embodiment) that is realized by the post-switching engagement clutch mechanism (the high-speed stage clutch mechanism 410H in the third embodiment), which should be engaged after the switching manipulation of the auxiliary speed change manipulation member 185, of the low-speed stage and high-speed stage clutch mechanisms 410L, 410H. In the third embodiment, the controller 100 controls the operation of the HST 10 to the output state (a gear ratio X32) where the actual vehicle speed is obtained (see (II) in FIG. 7).

In the idle running state, since the power transmission from the drive source 210 to the travel output shaft 47 is cut off, the vehicle speed is changed (is gradually decelerated in the third embodiment) according to the travel situation.

The controller 100 is configured to thereafter shift the post-switching engagement clutch mechanism (the high-speed stage clutch mechanism 410H in the third embodiment) to the engaged state and to control the operation of the speed change output device in the post-switching gear state (the high-speed stage state in the third embodiment) with the vehicle speed that is defined by the manipulation position of the main speed change manipulation member 180 at the time as the target vehicle speed.

In the third embodiment, the manipulation position (the manipulation amount) of the main speed change manipulation member 180 is not changed (is maintained with the manipulation amount of 70%) before and after the manipulation of the auxiliary speed change manipulation member 185. Thus, the controller 100 controls the operation of the HST 10 to the output state (the gear ratio X31) before the switching manipulation of the auxiliary speed change manipulation member 185 (see (III) in FIG. 7).

As a result, the vehicle speed is smoothly shifted to the target vehicle speed (31 km/h) at the time when the main speed change manipulation member 180 is manipulated to the position with the manipulation amount of 70% in the high-speed stage state.

Lastly, a description will be made on the gear stage switching operation of the auxiliary transmission unit 5 during the travel of the vehicle whose speed is equal to or higher than the low-speed stage highest speed a2 (20 km/h in this example), and, as an example (hereinafter referred to as a fourth embodiment), a case where the auxiliary speed change manipulation member 185 is manipulated from the high-speed stage selection state to the low-speed stage selection state during the travel of the vehicle in a state where the main speed change manipulation member 180 is manipulated to the position at which the manipulation amount is 100%.

Figure 8:
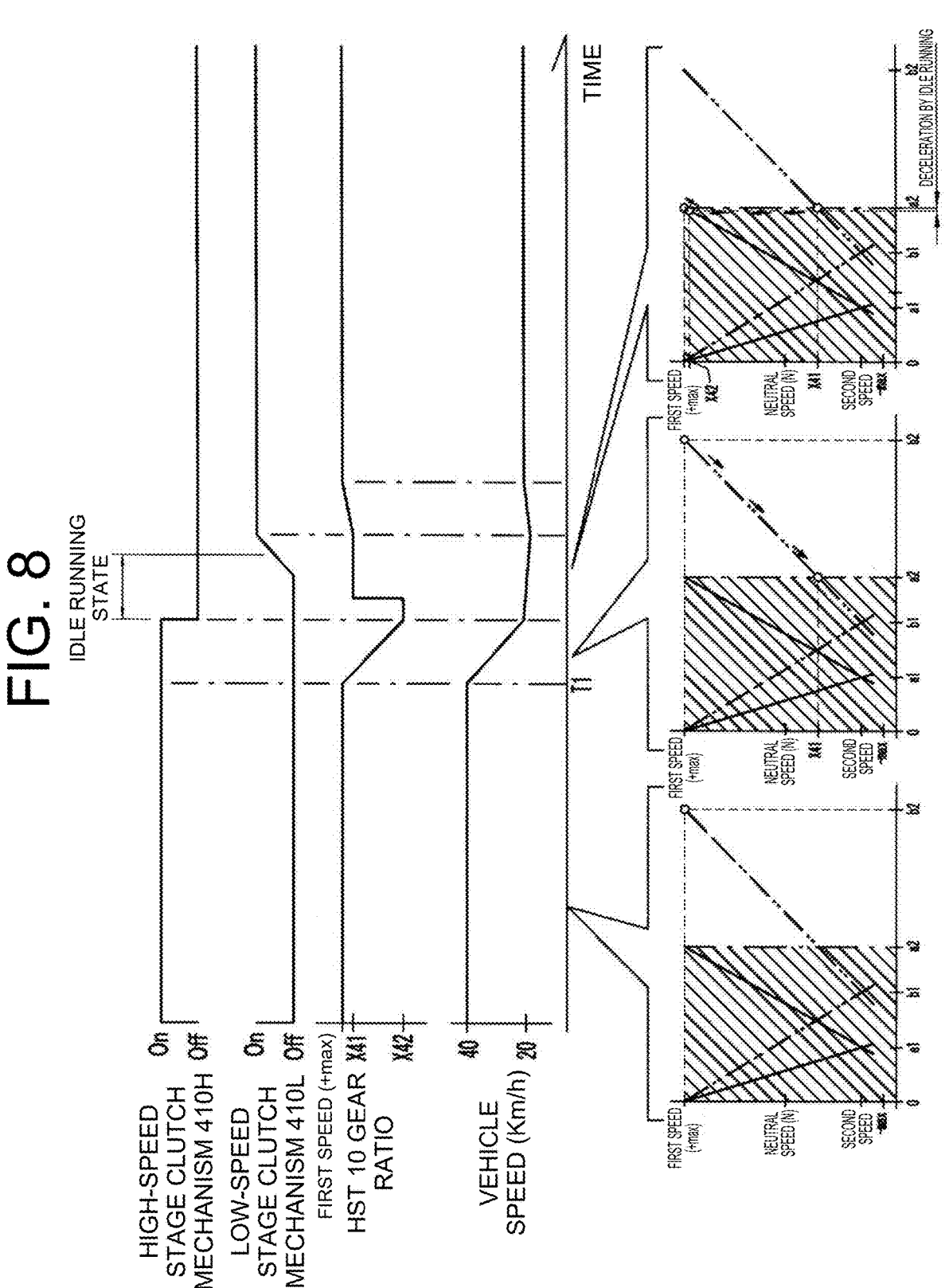
FIG. 8 is a graph illustrating a relationship between the time lapse and each of the engaged/disengaged states of the high-speed stage and low-speed stage clutch mechanisms, the output state of the speed change output device (the speed change state of the HST), and the vehicle speed (the rotational speed of the travel output shaft) in a fourth embodiment of the transmission structure.

FIG. 8 illustrates a relationship between the time lapse and each of the engaged/disengaged states of the high-speed stage clutch mechanism 410H and the low-speed stage clutch mechanism 410L, the output state of the speed change output device (the speed change state of the HST 10), and the vehicle speed (the rotational speed of the travel output shaft 47) in a fourth embodiment.

A relationship between the manipulation position (the manipulation amount) of the main speed change manipulation member 180 and the vehicle speed is as illustrated in the example in FIG. 3.

The target vehicle speed (40 km/h) at the time when the main speed change manipulation member 180 is manipulated to the position at which the manipulation amount is 100% in the high-speed stage state is equal to or higher than the high-speed stage switching speed b1 (14 km/h in this example). Accordingly, the controller 100 controls the operation of the speed change output device to realize the second-speed stage transmission state and obtain the target vehicle speed (40 km/h) in the second-speed stage transmission state. In the fourth embodiment, the controller 100 controls the operation of the HST 10 to the output state where the target vehicle speed is obtained. In the fourth embodiment, since the manipulation amount of the main speed change manipulation member 180 is 100%, a target output state of the HST 10 becomes the first gear (the highest speed+max in the forward direction).

In this state, when the auxiliary speed change manipulation member 185 is manipulated from the high-speed stage selection state to the low-speed stage selection state at the time T1, the controller 100 determines that immediate shifting from the high-speed stage state to the low-speed stage state is impossible due to a fact that the vehicle speed at the time exceeds the low-speed stage highest speed a2.

Thus, the controller 100 first controls the operation of the speed change output device while keeping the engaged state of the high-speed stage clutch mechanism 410H such that the vehicle speed is decelerated to the low-speed stage highest speed a2 (in the fourth embodiment, the operation of the HST 10 is controlled to realize the output state (a gear ratio X41) where the low-speed stage highest speed a2 is obtained in the high-speed stage state (see (II) in FIG. 8).

After performing such deceleration, the controller 100 shifts the high-speed stage clutch mechanism 410H to the disengaged state to realize the idle running state.

Next, during the idle running state, the controller 100 controls the operation of the speed change output device to obtain the vehicle speed that corresponds to the actual vehicle speed at the time in the low-speed stage state that is realized by the low-speed stage clutch mechanism 410L.

In the fourth embodiment, the controller 100 controls the operation of the HST 10 to the output state (a gear ratio X42) where the actual vehicle speed is obtained (see (III) in FIG. 8).

In the idle running state, since the power transmission from the drive source 210 to the travel output shaft 47 is cut off, the vehicle speed is changed (is gradually decelerated in the fourth embodiment) according to the travel situation.

The controller 100 is configured to thereafter shift the low-speed stage clutch mechanism 410L to the engaged state and to control the operation of the speed change output device in the low-speed stage state with the vehicle speed that is defined by the manipulation position of the main speed change manipulation member 180 at the time as the target vehicle speed.

In the fourth embodiment, the manipulation position (the manipulation amount) of the main speed change manipulation member 180 is not changed (is maintained with the manipulation amount of 100%) before and after the manipulation of the auxiliary speed change manipulation member 185. Thus, the controller 100 controls the operation of the HST 10 to the output state (the first gear (the highest speed+max in the forward direction)) before the switching manipulation of the auxiliary speed change manipulation member 185 (see (III) in FIG. 8).

As a result, the vehicle speed is smoothly shifted to the target vehicle speed (20 km/h) at the time when the main speed change manipulation member 180 is manipulated to the position at which the manipulation amount is 100% in the low-speed stage state.

Preferably, in the first to fourth embodiments, the controller 100 is configured to control the operation of the speed change output device to realize a constant speed travel state, where the vehicle speed at the time is maintained, and to realize the idle running state when the gear stage switching manipulation by the auxiliary speed change manipulation member 185 is performed during the travel of the vehicle.

The predetermined time is set in advance on the basis of data that is collected by a travel experiment or the like. However, preferably, the predetermined time can be changed to an appropriate time by a setting member, such as a dial, that can be manipulated manually to match travel feeling preferred by an individual user.

With such a configuration, it is possible to reduce the shock caused by fluctuations in the vehicle speed at the time when the power transmission of the pre-switching engagement clutch mechanism, which has been engaged before the switching manipulation of the auxiliary speed change manipulation member 185, of the low-speed stage clutch mechanism 410L and the high-speed stage clutch mechanism 410H is cut off to shift to the idle running state.

That is, when the pre-switching engagement clutch mechanism is disengaged in a state where the vehicle is accelerated or decelerated, the large shock is generated due to the vehicle speed fluctuation, and the user possibly feels uncomfortable. In particular, when the vehicle is traveling at the high speed, the shock is significant.

In this regard, it is configured to disengage the pre-switching engagement clutch mechanism after the constant travel for the predetermined time. In this way, it is possible to alleviate the shock at the time of disengaging the pre-switching engagement clutch mechanism and thus to improve the travel feeling.

In the fourth embodiment, the controller 100 is configured to decelerate the vehicle speed to the low-speed stage highest speed a2 in response to the manipulation of the auxiliary speed change manipulation member 185 into the low-speed stage selection state, to thereafter control the operation of the speed change output device to achieve the constant travel only for the predetermined time, and to disengage the high-speed stage clutch mechanism 410H after the constant speed travel.

Figure 9:
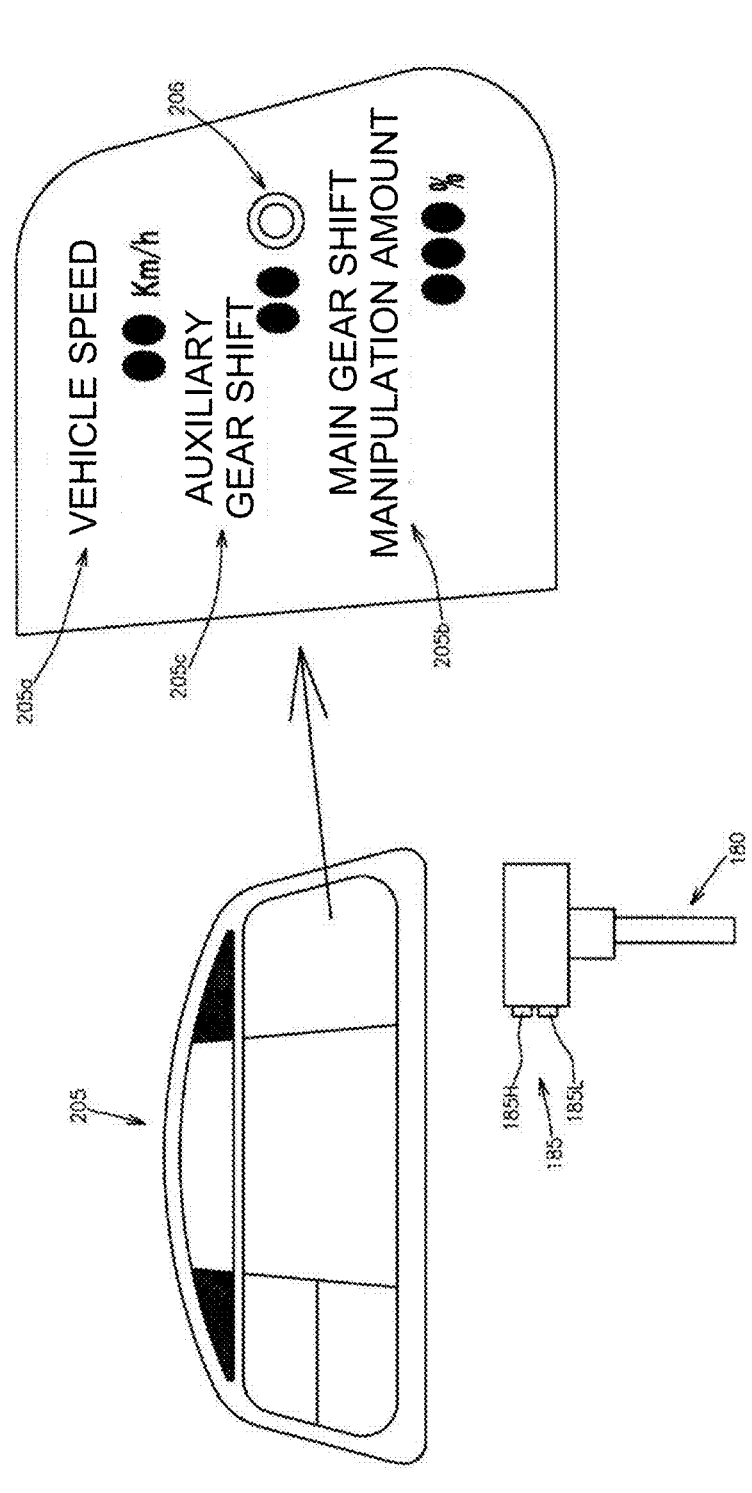
FIG. 9 is a schematic view of an example of a display monitor that cooperates with the transmission structure and examples of the main speed change manipulation member and an auxiliary speed change manipulation member.

FIG. 9 is a schematic view of an example of a display monitor 205 that can be provided to the driver's seat of the work vehicle 200A, to which the transmission structure 1A according to the present embodiment is applied, and the examples of the main speed change manipulation member 180 and the auxiliary speed change manipulation member 185.

In the example illustrated in FIG. 9, the auxiliary speed change manipulation member 185 has a high-gear switch 185H and a low-gear switch 185L.

The display monitor 205 includes: a region 205*a* where the travel vehicle speed at the current time is displayed; a region 205*b* where the manipulation position (the manipulation amount) of the main speed change manipulation member 180 is displayed; and a region 205*c* where the gear state (the low-speed stage state or the high-speed stage state) of the auxiliary transmission unit 5 is displayed.

Furthermore, the display monitor 205 includes notification means 206 to notify the user whether to switch the gear stage of the auxiliary transmission unit 5 at the current time.

The notification means 206 is a lamp, for example, and the controller 100 can be configured to turn on the lamp during the travel, during which the gear of the auxiliary transmission unit 5 can be switched, and turn off the lamp during the travel, during which the gear of the auxiliary transmission unit 5 cannot be switched.

Alternatively, the controller 100 can be configured to determine whether a speed difference between the vehicle speed before the switching manipulation and the vehicle speed after the switching manipulation exceeds a predetermined threshold value when the gear stage switching manipulation of the auxiliary speed change manipulation member 185 is performed at the time.

In this case, the display monitor 205 is provided with a determination display region, and whether the gear stage of the auxiliary transmission unit 5 can be switched is always displayed in the determination display region.

Instead, thereof or in addition thereto, the controller 100 can provide a warning display on the display monitor 205 when determining that the speed difference between the switching manipulation and the vehicle speed after the switching manipulation exceeds the predetermined threshold value in the case where the gear stage switching manipulation of the auxiliary speed change manipulation member 185 is actually performed.

Further alternatively, the work vehicle can include voice means and can be configured to provide the user with the warning by the voice means instead of or in addition to the warning display on the display monitor.

Figure 10:
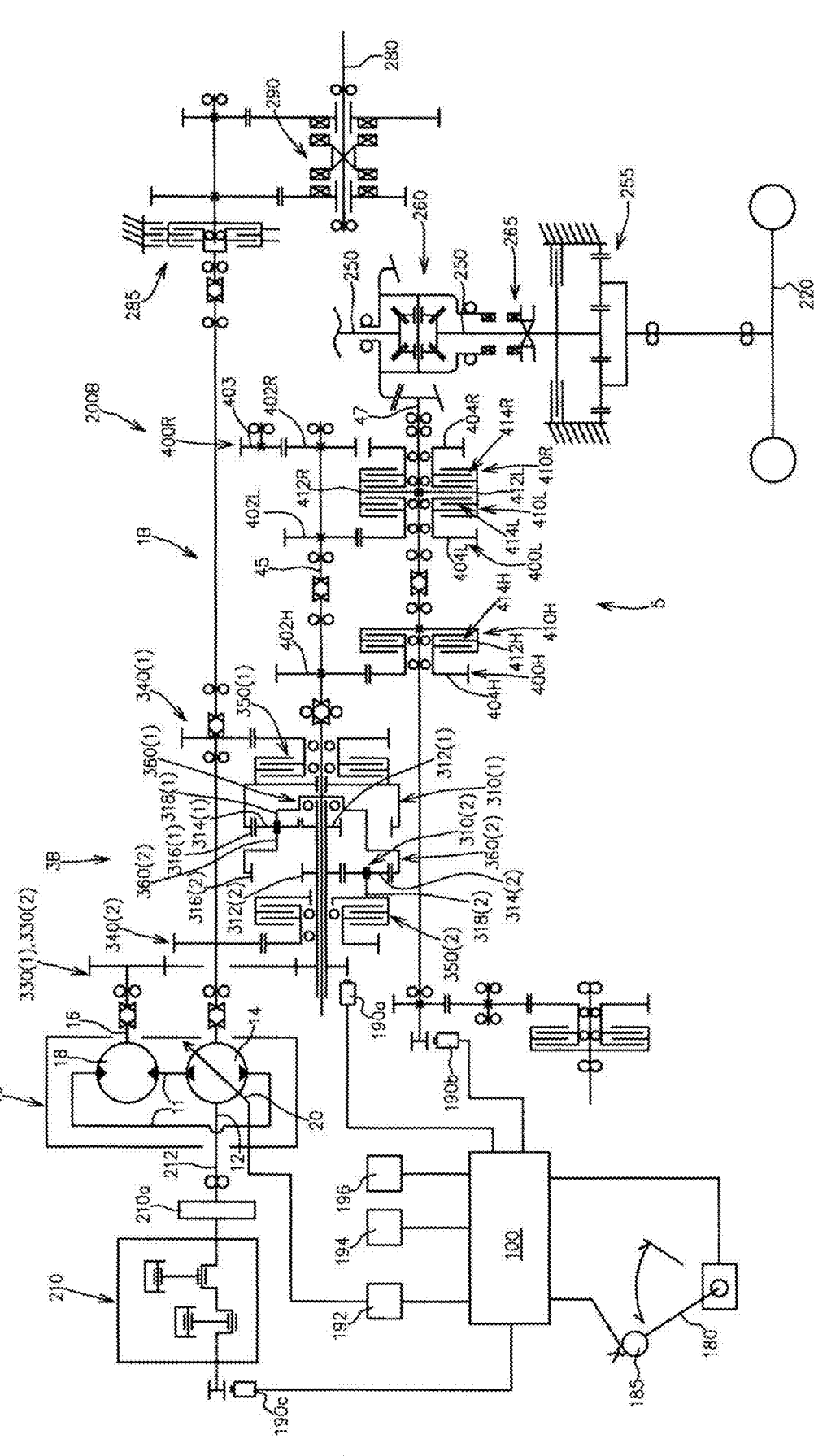
FIG. 10 is a view schematically illustrating the power transmission in the work vehicle, to which a transmission structure according to a modified example of the embodiment is applied.

FIG. 10 is a view schematically illustrating power transmission in a work vehicle 200B, to which a transmission structure 1B according to a modified example of the present embodiment is applied.

In FIG. 10, the same members will be denoted by the same reference signs in the present embodiment.

The transmission structure 1B differs from the transmission structure 1A in that the main transmission unit 3A is changed to a main transmission unit 3B.

More specifically, the transmission structure 1B has the main transmission unit 3B, the auxiliary transmission unit 5, the main speed change manipulation member 180, the auxiliary speed change manipulation member 185, and the controller 100.

As illustrated in FIG. 10, the main transmission unit 3B may be configured by combining the HST 10, which acts as the speed change output device, with a first-speed stage planetary gear mechanism 310(1) and a second-speed stage planetary gear mechanism 310(2).

More specifically, the main transmission unit 3B further has: a first speed change transmission path 330(1), through which the transmission rotary power is transmitted to a sun gear 312(1) of three planetary elements of the first-speed stage planetary gear mechanism 310(1); a first reference power transmission path 340(1), through which the reference rotary power is transmitted to a planetary element (for example, an internal gear 316(1) that acts as a reference power input section of each of the first element and the second element in the first-speed stage planetary gear mechanism 310(1); a first clutch mechanism 350(1) that engages/disengages the first reference power transmission path 340(1); an output-side first transmission path 360(1) that interlocks the planetary element (for example, a carrier 318(1)) with the travel intermediate shaft 45, such a planetary element forming a planetary output section and being other than the sun gear 312(1) and the planetary element (for example, a carrier 318(1)) forming the reference power input section of the three planetary elements of the first-speed stage planetary gear mechanism 310(1); a second speed change transmission path 330(2) through which the transmission rotary power is transmitted to a sun gear 312(2) of three planetary elements of the second-speed stage planetary gear mechanism 310(2); a second reference power transmission path 340(2), through which the reference rotary power is transmitted to a planetary element (for example, a carrier 318(2)) that acts as a reference power input section of the first element and the second element in the three planetary elements of the second-speed stage planetary gear mechanism 310(2); a second clutch mechanism 350(2) that engages/disengages the second reference power transmission path 340(2); and an output-side second transmission path 360(2) that interlocks the planetary element (for example, an internal gear 316(2)) with the travel intermediate shaft 45, such a planetary element forming the planetary output section and being other than the sun gear 312(2) and the planetary element (318(2)) forming the reference power input section of the three planetary elements of the second-speed stage planetary gear mechanism 310(2).

In the transmission structure 1B, the controller 100 is configured to engage the first clutch mechanism 350(1), disengage the second clutch mechanism 350(2), and thereby realize the first-speed stage transmission state in a range where the absolute value of the vehicle speed, which is recognized on the basis of the vehicle speed sensor 190$b$ or the pair of the engine speed sensor 190$c$ and the speed change output sensor 190$a$ (see FIG. 10), is up to the switching speed (that is, a range up to the low-speed stage switching speed a1 when the auxiliary transmission unit 5 is in the low-speed stage state, or a range up to the high-speed stage switching speed b1 when the auxiliary transmission unit 5 is in the high-speed stage state). The controller 100 is also configured to disengage the first clutch mechanism 350(1), engage the second clutch mechanism 350(2), and thereby realize the second-speed stage transmission state in a range where the absolute value of the vehicle speed from the switching speed to the highest speed (that is, a range from the low-speed stage switching speed a1 to the low-speed stage highest speed a2 when the auxiliary transmission unit 5 is in the low-speed stage state, or a range from the high-speed stage switching speed b1 to the high-speed stage highest speed b2 when the auxiliary transmission unit 5 is in the high-speed stage state).

In the present embodiment and the modified examples, the description has been made on the case where the transmission structures 1A, 1B are respectively applied to the vehicles 200A, 200B, each of which has the drive source 210 of the internal combustion engine type, as the example. However, the transmission structures 1A, 1B can also be applied to a work vehicle that includes the drive source of the electric motor.

REFERENCE SIGNS LIST

1A, 1B transmission structure
3A, 3B main transmission unit
5 auxiliary transmission unit
10 HST (speed change output device)
30 planetary gear mechanism
32 sun gear (third element)
36 internal gear (first element)
38 carrier (second element)
40 speed change transmission path
45 travel intermediate shaft
47 travel output shaft
50(1), 50(2) input-side first and second transmission paths
60(1), 60(2) input-side first and second clutch mechanisms
70(1), 70(2) output-side first and second transmission paths
80(1), 80(2) output-side first and second clutch mechanisms
100 controller
180 main speed change manipulation member
185 auxiliary speed change manipulation member
210 drive source
212 drive shaft
310(1), 310(2) first-speed stage and second-speed stage planetary gear mechanisms
312(1), 312(2) sun gear
316(1), 316(2) internal gear 318(1), 318(2) carrier 330(1), 330(2) first and second speed change transmission paths 340(1), 340(2) first and second reference power transmission paths 350(1), 350(2) first and second clutch mechanisms 360(1), 360(2) output-side first and second transmission paths 400L low-speed stage transmission path 400H high-speed stage transmission path 410L low-speed stage clutch mechanism 410H high-speed stage clutch mechanism

The invention claimed is:

1. A transmission structure that continuously changes reference rotary power of a drive shaft operatively coupled to a drive source and transmits the changed reference rotary power to a travel output shaft defining a vehicle speed, the transmission structure comprising:

a main transmission unit that has a speed change output device outputting transmission rotary power continuously changed at least between a first-speed stage and a second-speed stage and a planetary gear mechanism combining the reference rotary power and the transmission rotary power and that outputs combined output of the planetary gear mechanism as travel rotary power;

an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths;

a main speed change manipulation member and an auxiliary speed change manipulation member for manipulating the main transmission unit and the auxiliary transmission unit, respectively; and a controller, wherein the controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member, and controls operation of the main transmission unit to obtain a target vehicle speed that is defined by a manipulation position of the main speed change manipulation member for each of the low-speed stage state and the high-speed stage state, and the controller further:

when a switching manipulation of a gear stage is performed by the auxiliary speed change manipulation member in a state where the travel output shaft is rotationally driven, realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and controls operation of the speed change output device to obtain a vehicle speed that corresponds to an actual vehicle speed at the time in a post-switching gear state realized by a post-switching engagement clutch mechanism, which should be engaged after the switching manipulation by the auxiliary speed change manipulation member, of the low-speed stage and high-speed stage clutch mechanisms, during the idle running state; and thereafter shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

2. The transmission structure according to claim 1, wherein when the switching manipulation of the gear stage is performed by the auxiliary speed change manipulation member, the controller controls the operation of the speed change output device to realize a constant speed travel state, where the vehicle speed at the time is maintained, only for a predetermined time, and thereafter realizes the idle running state.

3. A transmission structure that continuously changes reference rotary power of a drive shaft operatively coupled to a drive source and transmits the changed reference rotary power to a travel output shaft defining a vehicle speed, the transmission structure comprising:

a main transmission unit that has a speed change output device outputting transmission rotary power continuously changed at least between a first-speed stage and a second-speed stage and a planetary gear mechanism combining the reference rotary power and the transmission rotary power and that outputs combined output of the planetary gear mechanism as travel rotary power;

an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths;

a main speed change manipulation member and an auxiliary speed change manipulation member for manipulating the main transmission unit and the auxiliary transmission unit, respectively; and a controller, wherein the main transmission unit can select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased as the transmission rotary power is shifted from the second-speed stage side to the first-speed stage side, the controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member, and the controller further:

realizes a first-speed stage transmission state when the vehicle speed in the low-speed stage state does not exceed a low-speed stage switching speed or the vehicle speed in the high-speed stage state does not exceed a high-speed stage switching speed; realizes the second-speed stage transmission state when the vehicle speed in the low-speed stage state exceeds the low-speed stage switching speed or the vehicle speed in the high-speed stage state exceeds the high-speed stage switching speed; controls operation of the main transmission unit by setting the vehicle speed that is defined by a manipulation position of the main speed change manipulation member as a target vehicle speed for each of the low-speed stage state and the high-speed stage state;

in the case where a switching manipulation of a gear stage is performed by the auxiliary speed change manipulation member when the travel output shaft is rotationally driven and the vehicle speed is equal to or lower than the low-speed stage switching speed, realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and controls operation of the speed change output device to obtain a vehicle speed that corresponds to an actual vehicle speed at the time in a post-switching gear state realized by a post-switching engagement clutch mechanism, which should be engaged after the switching manipulation by the auxiliary speed change manipulation member, of the low-speed stage and high-speed stage clutch mechanisms, during the idle running state; and thereafter shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

4. The transmission structure according to claim 3, wherein the main transmission unit comprising:

a speed change transmission path, through which the transmission rotary power is transmitted to a third element of three planetary elements of the planetary gear mechanism;

first and second input-side transmission paths, through which the reference rotary power is respectively transmitted to a first element and a second element of the three planetary elements of the planetary gear mechanism; first and second input-side clutch mechanisms that respectively engage/disengage the first and second input-side transmission paths; first and second output-side transmission paths, through which rotary power of the first element and the second element are respectively transmitted to a travel intermediate shaft; and first and second output-side clutch mechanisms that respectively engage/disengage the first and second output-side transmission paths, realizes the first-speed stage transmission state by engagement of the first input-side and output-side clutch mechanisms, and realizes the second-speed stage transmission state by engagement of the second input-side and output-side clutch mechanisms, and the auxiliary transmission unit is arranged to perform multi-stage gear shifting between the travel intermediate shaft and the travel output shaft.

5. The transmission structure according to claim 4, wherein the planetary gear mechanism, the first and second input-side transmission paths, and the first and second output-side transmission paths are set such that a rotational speed of the second element at the time when the output of the speed change output device is at the second-speed stage in the first-speed stage transmission state is substantially the same as the rotational speed of the second element at the time of the second-speed stage transmission state and that a rotational speed of the first element at the time of the first-speed stage transmission state is substantially the same as the rotational speed of the first element at the time when the output of the speed change output device is at the second-speed stage in the second-speed stage transmission state.

6. The transmission structure according to claim 3, wherein the main transmission unit comprising:

a first-speed stage planetary gear mechanism and a second-speed stage planetary gear mechanism, each of which acts as the planetary gear mechanism;

a first speed change transmission path, through which the transmission rotary power is transmitted to a sun gear of three planetary elements of the first-speed stage planetary gear mechanism;

a first reference power transmission path, through which the reference rotary power is transmitted to a planetary element, which acts as a reference power input section, of a first element and a second element of the three planetary elements of the first-speed stage planetary gear mechanism; a first clutch mechanism that engages/disengages the first reference power transmission path;

a first output-side transmission path, through which a planetary element, which forms a planetary output section, other than the sun gear and the planetary element forming the reference power input section of the three planetary elements of the first-speed stage planetary gear mechanism is interlocked to the travel intermediate shaft;

a second speed change transmission path, through which the transmission rotary power is transmitted to a sun gear of three planetary elements of the second-speed stage planetary gear mechanism;

a second reference power transmission path, through which the reference rotary power is transmitted to a planetary element, which acts as a reference power input section, of a first element and a second element of the three planetary elements of the second-speed stage planetary gear mechanism;

a second clutch mechanism that engages/disengages the second reference power transmission path; and a second output-side transmission path, through which a planetary element, which forms a planetary output section, other than the sun gear and the planetary element forming the reference power input section of the three planetary elements of the second-speed stage planetary gear mechanism is interlocked to the travel intermediate shaft, realizes the first-speed stage transmission state by engagement of the first clutch mechanism, and realizes the second-speed stage transmission state by engagement of the second clutch mechanism, and the auxiliary transmission unit is arranged to perform multi-stage gear shifting between the travel intermediate shaft and the travel output shaft.

7. A transmission structure that continuously changes reference rotary power of a drive shaft operatively coupled to a drive source and transmits the changed reference rotary power to a travel output shaft defining a vehicle speed, the transmission structure comprising:

a main transmission unit that has a speed change output device outputting transmission rotary power continuously changed at least between a first-speed stage and a second-speed stage and a planetary gear mechanism combining the reference rotary power and the transmission rotary power and that outputs combined output of the planetary gear mechanism as travel rotary power;

an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths;

a main speed change manipulation member and an auxiliary speed change manipulation member for manipulating the main transmission unit and the auxiliary transmission unit, respectively; and a controller, wherein the main transmission unit can select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased from the lowest speed as the transmission rotary power is shifted from the second-speed stage side to the first-speed stage side, the controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member, and the controller further:

realizes the first-speed stage transmission state when the vehicle speed in the low-speed stage state does not exceed a low-speed stage switching speed or the vehicle speed in the high-speed stage state does not exceed a high-speed stage switching speed; realizes the second-speed stage transmission state when the vehicle speed in the low-speed stage state exceeds the low-speed stage switching speed or the vehicle speed in the high-speed stage state exceeds the high-speed stage switching speed; controls operation of the main transmission unit by setting the vehicle speed that is defined by a manipulation position of the main speed change manipulation member as a target vehicle speed for each of the low-speed stage state and the high-speed stage state;

further, in the case where a switching manipulation of a gear stage is performed by the auxiliary speed change manipulation member when the travel output shaft is rotationally driven, the vehicle speed is equal to or higher than the low-speed stage switching speed and is equal to or lower than the high-speed stage switching speed, realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and switches between the first-speed stage transmission state and the second-speed stage transmission state after controlling operation of the speed change output device to obtain the switching speed in the pre-switching gear state, which has been realized by the pre-switching engagement clutch mechanism, during the idle running state;

further, controls the operation of the speed change output device to obtain a vehicle speed corresponding to an actual vehicle speed at the time in the post-switching gear state realized by the post-switching engagement clutch mechanism, which should be engaged after the switching manipulation by the auxiliary speed change manipulation member, of the low-speed stage and high-speed stage clutch mechanisms; and thereafter shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

8. A transmission structure that continuously changes reference rotary power of a drive shaft operatively coupled to a drive source and transmits the changed reference rotary power to a travel output shaft defining a vehicle speed, the transmission structure comprising:

a main transmission unit that has a speed change output device outputting transmission rotary power continuously changed at least between a first-speed stage and a second-speed stage and a planetary gear mechanism combining the reference rotary power and the transmission rotary power and that outputs combined output of the planetary gear mechanism as travel rotary power;

an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths;

a main speed change manipulation member and an auxiliary speed change manipulation member for manipulating the main transmission unit and the auxiliary transmission unit, respectively; and a controller, wherein the main transmission unit can select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased from the lowest speed as the transmission rotary power is shifted from the second-speed stage side to the first-speed stage side, the controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member, and the controller further:

realizes the first-speed stage transmission state when the vehicle speed in the low-speed stage state does not exceed a low-speed stage switching speed or the vehicle speed in the high-speed stage state does not exceed a high-speed stage switching speed; realizes the second-speed stage transmission state when the vehicle speed in the low-speed stage state exceeds the low-speed stage switching speed or the vehicle speed in the high-speed stage state exceeds the high-speed stage switching speed; then, controls operation of the main transmission unit by setting the vehicle speed that is defined by a manipulation position of the main speed change manipulation member as a target vehicle speed for each of the low-speed stage state and the high-speed stage state;

further, in the case where a switching manipulation of a gear stage is performed by the auxiliary speed change manipulation member when the travel output shaft is rotationally driven and the vehicle speed is equal to or higher than the high-speed stage switching speed and equal to or lower than a low-speed stage highest speed, realizes an idle running state by shifting a pre-switching engagement clutch mechanism, which has been engaged before the switching manipulation by the auxiliary speed change manipulation member, of the low-speed stage and high-speed stage clutch mechanisms, to a disengaged state, and controls operation of the speed change output device to obtain a vehicle speed that corresponds to an actual vehicle speed at the time in a post-switching gear state realized by a post-switching engagement clutch mechanism, which should be engaged after the switching manipulation by the auxiliary speed change manipulation member, of the low-speed stage and high-speed stage clutch mechanisms, during the idle running state; and thereafter shifts the post-switching engagement clutch mechanism to an engaged state, and, in the post-switching gear state, controls the operation of the speed change output device by setting the vehicle speed that is defined by the manipulation position of the main speed change manipulation member at the time as the target vehicle speed.

9. A transmission structure that continuously changes reference rotary power of a drive shaft operatively coupled to a drive source and transmits the changed reference rotary power to a travel output shaft defining a vehicle speed, the transmission structure comprising:

a main transmission unit that has a speed change output device outputting transmission rotary power continuously changed at least between a first-speed stage and a second-speed stage and a planetary gear mechanism combining the reference rotary power and the transmission rotary power and that outputs combined output of the planetary gear mechanism as travel rotary power;

an auxiliary transmission unit that can change the travel rotary power from the main transmission unit in multiple stages and transmit the changed travel rotary power to the travel output shaft, the auxiliary transmission unit including a low-speed stage transmission path and a high-speed stage transmission path, through which the travel rotary power from the main transmission unit is transmitted to the travel output shaft at a forward-side low-speed gear ratio and a forward-side high-speed gear ratio, respectively, and low-speed stage and high-speed stage clutch mechanisms that respectively engage/disengage the low-speed stage and high-speed stage transmission paths;

a main speed change manipulation member and an auxiliary speed change manipulation member for manipulating the main transmission unit and the auxiliary transmission unit, respectively; and a controller, wherein the main transmission unit can select between a first-speed stage transmission state and a second-speed stage transmission state, where in the first-speed stage transmission state, a speed of the combined output of the planetary gear mechanism being increased as the transmission rotary power is shifted from the first-speed stage side toward the second-speed stage side; and, in the second-speed stage transmission state, the highest speed in the first-speed stage transmission state is set as the lowest speed, and the speed of the combined output of the planetary gear mechanism is increased from the lowest speed as the transmission rotary power is shifted from the second-speed stage side to the first-speed stage side, the controller controls operation of the auxiliary transmission unit to realize a low-speed stage state by engagement of the low-speed stage clutch mechanism and a high-speed stage state by engagement of the high-speed stage clutch mechanism according to a manipulation of the auxiliary speed change manipulation member, and the controller further:

realizes the first-speed stage transmission state when the vehicle speed in the low-speed stage state does not exceed a low-speed stage switching speed or the vehicle speed in the high-speed stage state does not exceed a high-speed stage switching speed; realizes the second-speed stage transmission state when the vehicle speed in the low-speed stage state exceeds the low-speed stage switching speed or the vehicle speed in the high-speed stage state exceeds the high-speed stage switching speed; then, controls operation of the main transmission unit by setting the vehicle speed that is defined by a manipulation position of the main speed change manipulation member as a target vehicle speed for each of the low-speed stage state and the high-speed stage state;

further, in the case where a switching manipulation from a high-speed stage to a low-speed stage is performed by the auxiliary speed change manipulation member when the travel output shaft is rotationally driven and the vehicle speed is equal to or higher than the low-speed stage highest speed, controls operation of the speed change output device to reduce the vehicle speed to the low-speed stage highest speed while maintaining an engaged state of the high-speed stage clutch mechanism, realizes an idle running state by shifting the high-speed stage clutch mechanism to a disengaged state after the deceleration, and controls the operation of the speed change output device to obtain a vehicle speed that corresponds to an actual vehicle speed at the time in the low-speed stage state realized by the low-speed stage clutch mechanism during the idle running state; and thereafter shifts the low-speed stage clutch mechanism to an engaged state, and, in the low-speed stage state, controls the operation of the speed change output device by setting the vehicle speed that is defined by the manipulation position of the main speed change manipulation member at the time as the target vehicle speed.

* * * * *